United States Patent
Garrote et al.

(10) Patent No.: US 11,803,428 B2
(45) Date of Patent: Oct. 31, 2023

(54) FEATURE BASED APPLICATION PROGRAMMING INTERFACE FEDERATION

(71) Applicant: Salesforce, Inc., San Francisco, CA (US)

(72) Inventors: Antonio Garrote, San Francisco, CA (US); Patricio Barletta, Foster City, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/245,669

(22) Filed: Apr. 30, 2021

(65) Prior Publication Data
US 2022/0350678 A1 Nov. 3, 2022

(51) Int. Cl.
*G06F 3/00* (2006.01)
*G06F 9/54* (2006.01)

(52) U.S. Cl.
CPC .............. *G06F 9/541* (2013.01); *G06F 9/547* (2013.01)

(58) Field of Classification Search
CPC ....................................................... G06F 9/542
USPC ................................................. 719/328, 326
See application file for complete search history.

(56) References Cited

U.S. PATENT DOCUMENTS 7,788,370 B2 * 8/2010 Yugami ............... G06F 11/3495
714/39
9,813,509 B1 * 11/2017 Visser ...................... G06F 9/547
2009/0216702 A1 * 8/2009 Proctor ................... G06N 5/025
706/48
2012/0278658 A1 * 11/2012 Han ..................... G06F 11/3636
714/38.1
2014/0208296 A1 * 7/2014 Dang ........................ G06F 8/77
717/123
2016/0019102 A1 * 1/2016 Cui ......................... G06F 9/542
719/328
2018/0039570 A1 * 2/2018 Rajagopalan ....... G06F 11/3688
2018/0232262 A1 * 8/2018 Chowdhury ............ G06F 9/541
2018/0232404 A1 * 8/2018 Bhatti ................. G06F 16/9024
2018/0357094 A1 * 12/2018 Kim ...................... G06F 3/0486
2021/0406104 A1 * 12/2021 Omishima ............ G06F 11/323

OTHER PUBLICATIONS

Jiri Sebek, On Aspect-Oriented Programming in Adaptive User Interfaces. (Year: 2015).*
Hao Zhong, MAPO: Mining and Recommending API Usage Patterns. (Year: 2009).*

(Continued)

*Primary Examiner* — Lechi Truong
(74) *Attorney, Agent, or Firm* — Holland & Hart LLP

(57) ABSTRACT

Methods, apparatuses, and computer program products for feature based application programming interface (API) federation are disclosed. In some examples, a federated API manager may receive user input indicating source APIs including features for data processing. The federated API manager may identify elements forming one or more patterns from the features based on federation protocols. The federated API manager may identify federated operations based on the identified elements and federation operation rules. The federated API manager may generate a federated API schema based on the federated operation rules, and the federated API schema may expose the federated operations.

15 Claims, 14 Drawing Sheets

(56) References Cited

OTHER PUBLICATIONS

Andreas Thalhammer, SUMMA: A Common API for Linked Data Entity Summaries. (Year: 2015).*
Wei Zhou, Rest API Design Patterns for SDN Northbound API. (Year: 2014).*
Eyal Oren, ActiveRDF: object-oriented RDF in Ruby. (Year: 2002).*

* cited by examiner

FEATURE BASED APPLICATION PROGRAMMING INTERFACE FEDERATION

FIELD OF TECHNOLOGY

The present disclosure relates generally to database systems and data processing, and more specifically to feature based application programming interface federation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Users of cloud systems often interact with the cloud systems via an application programming interface (API). Further, users of cloud systems often interact with various APIs of varying types and having various characteristics (e.g., REST, RPC, Query, Batch, etc.). For ease of use, users of these various APIs may federate these APIs into a single federated API. However, in some federation approaches, the various APIs may have interrelated hard dependencies, so that if one of the APIs is changed in some way, the other APIs may not be able to interface with the changed API, and the federated API may be broken. Further, much of the coordination that takes place in some API federation approaches must be done manually by the user.

DETAILED DESCRIPTION

Figure 1:
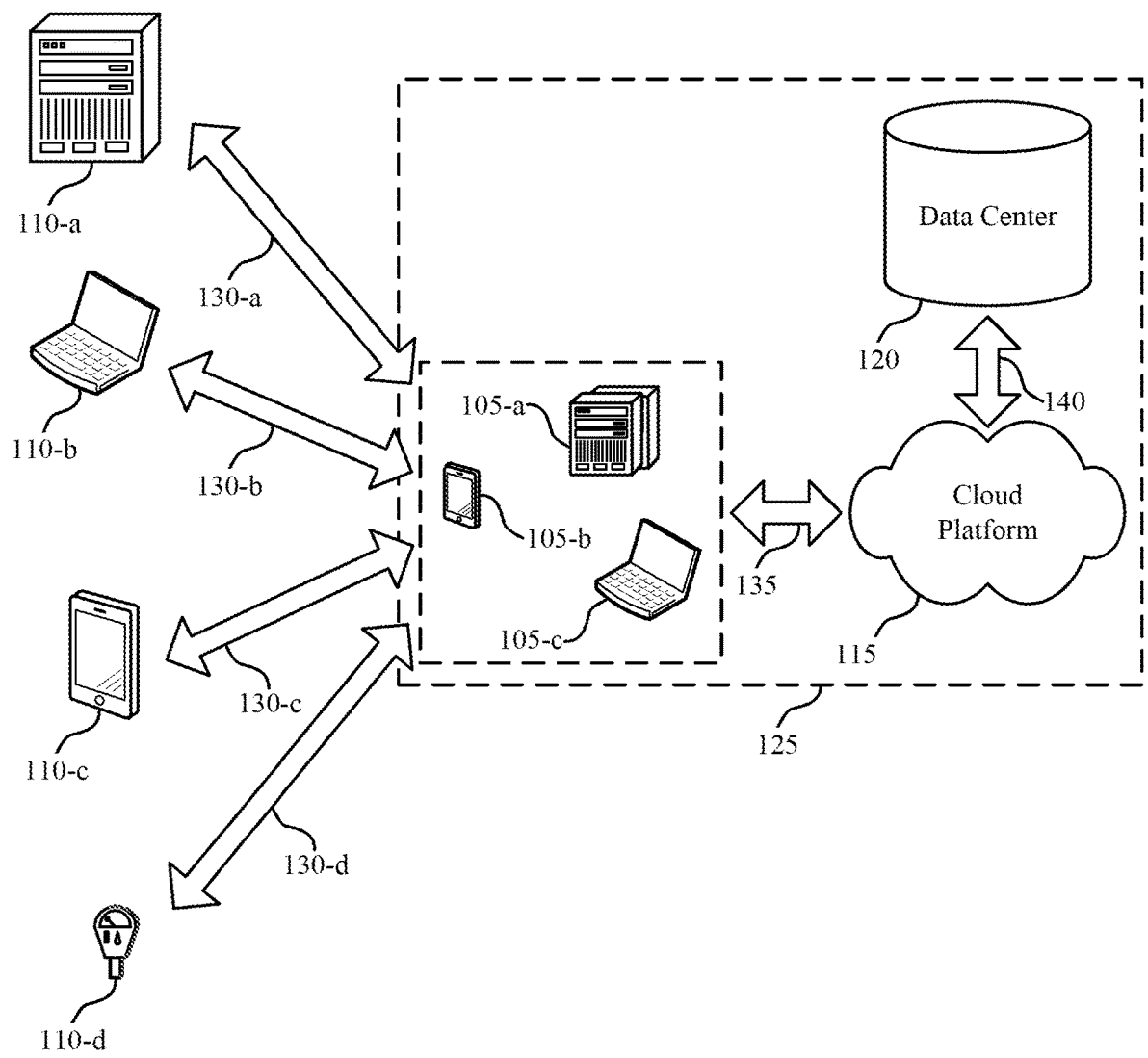
FIG. 1 illustrates an example of a generating a federated application programming interface (API) schema by a federated API manager system that supports feature based application programming interface federation in accordance with aspects of the present disclosure.

In some cloud systems or platforms, users may interact with the cloud system via an application programming interface (API). Further, users of cloud systems often interact with various APIs of varying types and having various characteristics. In some cloud systems, the various APIs may be federated into a single interface through which the user may access the functions and data of the various APIs. In some examples, a cloud platform may utilize a federated API manager that may automatically recognize patterns among the various APIs, and may break the various APIs into individual features common to the various APIs. In some examples, the federated API manager may map the various APIs to these common features, and the cloud platform may compose a federated API without having hard dependencies between the constituent APIs. For example, the individual source APIs may still be modified, updated, or changed without breaking the federated API. In the process of forming the federated API, the federated API manager may perform one or more consistency checks to ensure that each of the various constituent APIs and features all work together without errors. By assembling the federated API in this way, each individual API may also change and evolve while still ensuring the consistency of the federated API.

In some examples, the federated API manager may receive user input that indicates a first and second source API to be federated. Each of the first and second source APIs may include one or more features for data processing. The federated API manager may identify one or more elements forming one or more patterns from the features of the first and second source APIs. In some examples, the federated API manager may identify these elements based on one or more federation protocols. The federated API manager may identify one or more federated operations based on the identified elements and one or more federated operation rules. The federated API manager may generate a federated API schema based on the one or more federated operation rules. In some examples, the federated API schema may expose the one or more federated operations so that the user may interact with the federated API, which may have access to the features and data of the source APIs. In this way, the federated API may be composed and utilized by the user without creating hard dependencies between source APIs, and the source APIs may be changed or updated without breaking the federated API. Thus, the technical problems present in other approaches, where source APIs have hard dependencies and cannot be altered without breaking the federated API, are reduced or eliminated.

In some examples, the federated API manager may identify that elements of the source APIs are compatible elements. For example, the federated API manager may identify that elements of the source APIs each include a compatible element identifier, a compatible data type, a compatible dataset instance identifier, a compatible lookup field associated with the compatible dataset instance identifier, a reference from one element to another, or any combination thereof. The federated API manager may form one or more federated elements through element extension, element composition, an element reference, or any combination thereof. In some examples, the federated API manager may identify errors arising in the composition of the federated API, and the federated API manager may perform a conflict resolution operation (e.g., renaming or hiding an element or a sub-element) to resolve errors arising in the federated API.

Aspects of the disclosure are initially described in the context of an environment supporting an on-demand database service. Aspects of the disclosure are then illustrated by diagrams of database systems, federation processes, an example graphical user interface, and a process flow. Aspects of the disclosure are further illustrated by and described with reference to apparatus diagrams, system diagrams, and flowcharts that relate to feature based application programming interface federation.

FIG. 1 illustrates an example of a system 100 for cloud computing that supports feature based application programming interface federation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the cloud platform 115 may receive user input (e.g., from a cloud client 105) that indicates a first and second source API to be federated. Each of the first and second source APIs may include one or more features for data processing. The cloud platform 115 may identify one or more elements forming one or more patterns from the features of the first and second source APIs. In some examples, cloud platform 115 may identify these elements based on one or more federation protocols. The cloud platform 115 may identify one or more federated operations based on the identified elements and one or more federated operation rules. The cloud platform 115 may generate a federated API schema based on the one or more federated operation rules. In some examples, the federated API schema may expose (e.g., to one or more cloud clients 105) the one or more federated operations so that a cloud client 105 may interact with the federated API, which may have access to the features and data of the source APIs. In this way, the federated API may be composed by the cloud platform 115 and utilized by a cloud client 105 without creating hard dependencies between source APIs, and the source APIs may be changed or updated without breaking the federated API.

In some approaches to API federation, each of the source APIs may be strictly matched with each of the other source APIs, and if a source API makes a change in nomenclature, data types, or another element, the federated API may not be able to access features or data of the source API. Further, the source APIs may have hard dependencies between each other, such that if a source API is changes, another source API may also have to be changed in a similar way to accommodate the change in the first source API. In addition, many such changes to maintain compatibility and functionality of the federated API may be performed manually by a user or an administrator.

The approaches described herein include utilization of a federated API manager that may break the source APIs into individual features that can be federated (e.g., read, list, update, query, subscribe, publish), and may further define federation primitives that can be used to expose such features in an API independent way (e.g., identifiers, finders, or reverse-finder methods). The federated API manager may also map different APIs to a set of common features and allow enrichment of those features with the federation primitives. In this way, the individual APIs may be composed into a federated API without hard dependencies between the individual APIs. This identification, mapping, and composition may be performed automatically based on federated operation rules, federation protocols, or other parameters, thus reducing or eliminating the need for a user or administrator to intervene.

Additionally, or alternatively, the federated API manager may check the consistency of the federated API automatically, notifying owners of the individual APIs if some aspect of their APIs will break the overall federated API. Further, the federated API manager may also perform one or more conflict resolutions operations (either automatically or as prompted by a user or administrator) to resolve errors arising in the generation of the federated API. The federated API may be exposed in any combination of protocols that support the features of the source APIs that are being federated. In addition, consistency checks based on rules, configurations, or other parameters may be performed to ensure consistency and allow for future additions of features to the source APIs. Thus, a flexible and agile mechanism for federation and collaboration of the source APIs may be achieved without compromising the ability of the individual APIs to change and evolve. Through these approaches, the technical problems present in other approaches where the source APIs have hard interdependencies and may not be modified or updated without breaking the federation may be reduced or eliminated.

For example, if a user desires to federate a number of APIs (e.g., an API dealing with customer orders and an API dealing with shipping of products to the customers) to more easily manage the APIs and the data associated with the APIs, the user may send a request (e.g., via a cloud client 105) to the cloud platform 115 identifying the source APIs to be federated. The cloud platform 115 may identify elements from the features found in the source APIs that may form patterns. The cloud platform 115 may recognize those patterns and identify or determine federated operations based on those pattern forming elements. The cloud platform 115 may form a federated API that may expose these federated operations to the user, such that the user may access the functions and data from the source APIs through the unified interface of the federated API.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
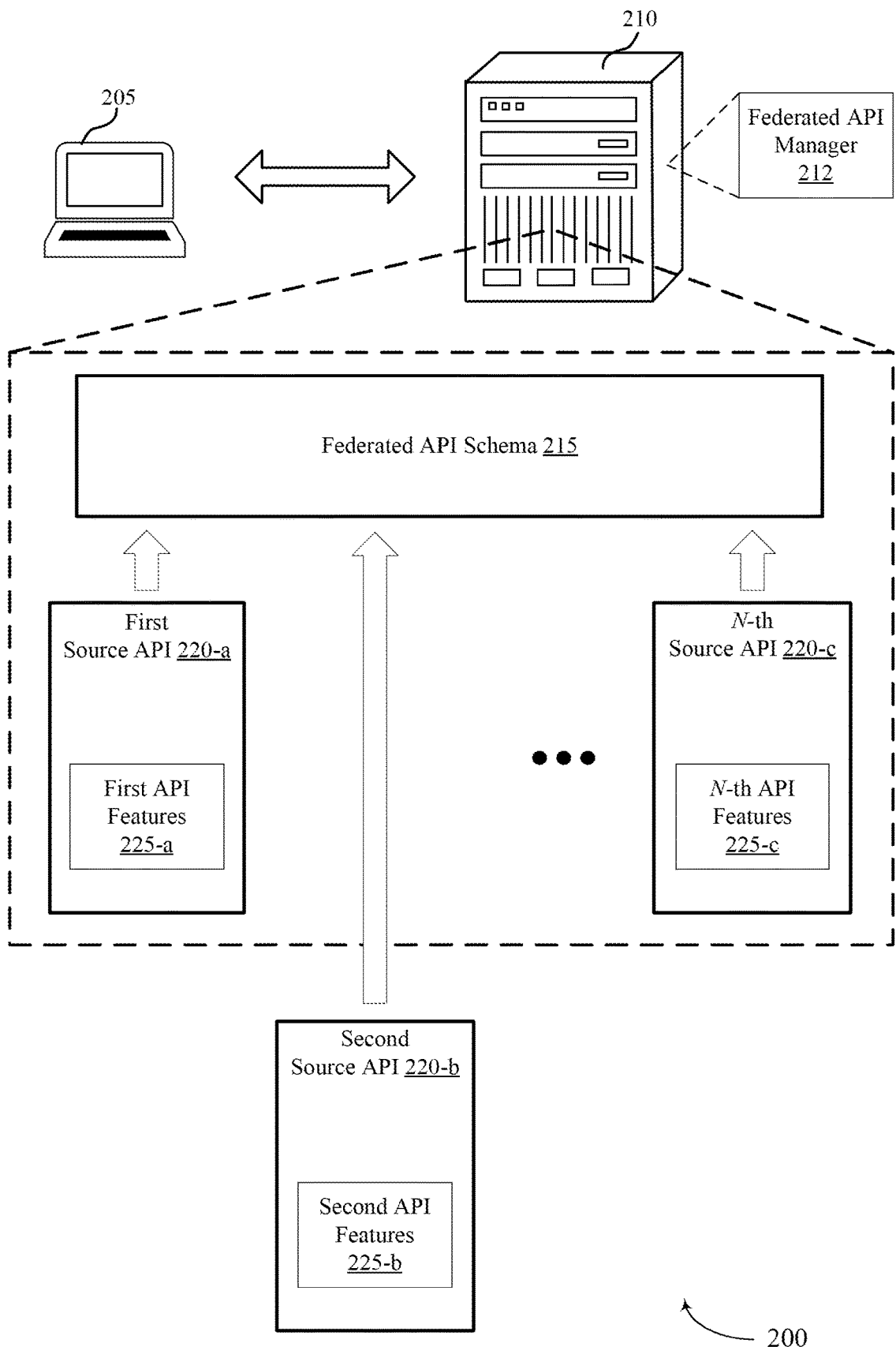
FIG. 2 illustrates an example of a database system that supports feature based application programming interface federation in accordance with aspects of the present disclosure.

FIG. 2 illustrates an example of a database system 200 that supports feature based application programming interface federation in accordance with aspects of the present disclosure. The database system 200 may include a client 205 and an application server 210.

The application server 210 may support a federated API manager 212 that may generate a federated API schema 215. The federated API schema 215 may offer capabilities (e.g., capabilities or features such as read, list, update, query, subscribe, or publish) at a federated level. For example, the federated API schema 215 may expose an endpoint to which a client 205 may connect to utilize a query capability at the federated level.

The federated API manager 212 may generate the federated API schema 215 based on a number of source APIs, such as the first source API 220-a and the second source API 220-b. The federated API schema 215 may be generated based on any number of source APIs, represented by the N-th source API 220-c. Each of the source APIs 220 may include features, such as the first API features 225-a associated with the first source API 220-a, the second API features 225-b associated with the second source API 220-b, and the N-th API features 225-c associated with the N-th source API 220-c. In some examples, the API features 225 may include data processing capabilities, data storage capabilities, data transformation capabilities, or other data processing tasks. For example, an API feature 225 may include retrieval of data associated with a customer based on an input provided by the client 205, and the API feature 225 may return the requested data to the client 205.

In some examples, the source APIs may enter into the federation actively. The source APIs may comply with a federation protocol, and the generation of the federated API schema 215 may be based upon such a federation protocol. The federation protocol may define, identify, or select rules, procedures, configurations, or other parameters that define how the federated API schema 215 may be generated. In some examples, the federation protocol may be regarded as a contract that binds the federated parts, and governs the relationships between the various source APIs 220 and associated API features 225. In some examples, the federation protocol may include federation metadata. For example, the federation protocol may include various elements, including names, fields, finders, keys, linking, and extensions, that may define or identify various relationships between the source APIs 220 to aid in the generation of the federated API schema 215.

In some examples, the federated API manager 212 may generate the federated API schema 215 by automatically generating or manipulating federation metadata from the source APIs 220. The federated API manager 212 may further configure, customize, or manipulate the federation metadata to comply with the federation protocol, and the federation metadata may be used as input for the execution of runtime federated operations. In some examples, generation of the federated API schema 215 may include a set of customizations that may be applied to the source APIs 220 to prepare or modify the source APIs 220 for federations. In some examples, federation specific metadata (e.g., links or references across different source APIs 220) may be designed to make any conceptual connections across the source APIs 220 explicit and consumable. In some examples, generation of the federated API schema 215 may also include the design, selection, or identification of governance tools that may ensure that changes to the individual source APIs 220 do not break the federated API schema 215 and the integrations of any clients that may be consuming the federated API schema 215.

In some examples, the federated API manager 212 may generate the federated API schema 215 by generating a federated API metadata model or data graph. A data graph may be an API model that describes the various features, data, resources, or connections of an API (e.g., the source APIs 220). In some examples, the input API models may be transformed into a data graph that may be consumed by a query (or other operational) engine. In some examples, one or more data graphs may be merged into a single data graph that may be the logical union of the individual data graphs, in some cases without loss of information. In some examples, one or more federated operations may be performed on such a merged data graph (e.g., the merged data graph may be queried).

In some examples, the source APIs 220 may be autonomous. That is, the source APIs 220 may be free to change and evolve over time. In some examples, the source APIs 220 may be free to change and evolve as long as they comply with the federation protocol. In some examples, such a federated API schema 215 or other federated systems may be decentralized systems, including portions that are associated with various systems, servers, machines, virtual machines, processing nodes, workers, or other data processing elements. For example, as shown in FIG. 2, the second source API 220-b may be associated with a different application server (and may not be associated with the application server 210 on which the federated API schema 215 is generated). In some examples, all of the source APIs 220 may be associated with the application server 210. In other examples, a portion of the source APIs 220 or none or the source APIs 220 may be associated with the application server 210.

Figure 3:
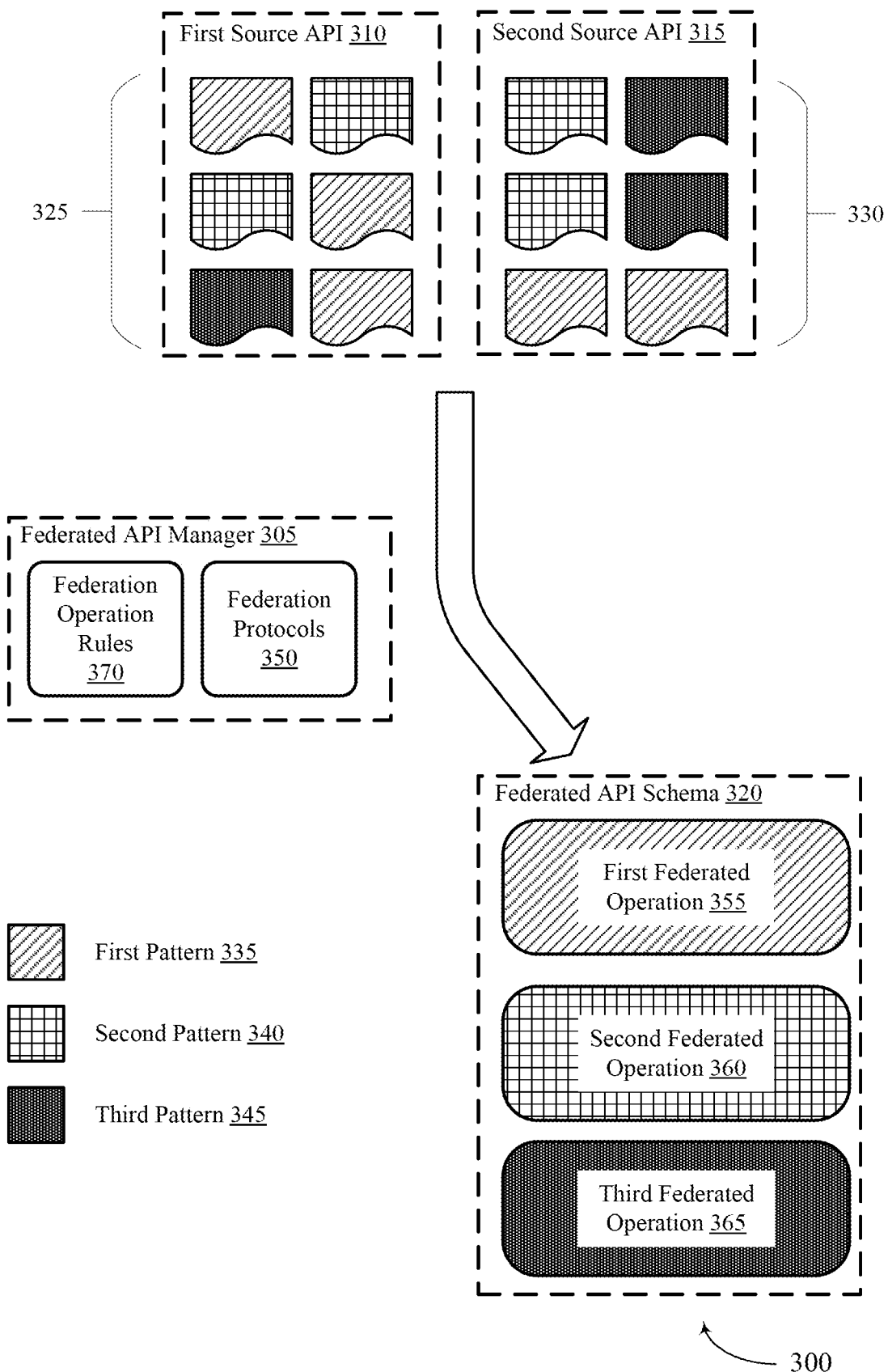
FIG. 3 illustrates an example of a database system that supports feature based application programming interface federation in accordance with aspects of the present disclosure.

FIG. 3 illustrates an example of a database system 300 that supports feature based application programming interface federation in accordance with aspects of the present disclosure. In some examples, the database system may include an application server, on which a federated API manager 305 may operated. The federated API manager 305 may generate a federated API schema 320 based on a first source API 310 and a second source API 315. Though only two source APIs are described in relation to FIG. 3, the federated API manager 305 may use any number of source APIs to generate the federated API schema 320.

In some examples, the first source API 310 and the second source API 315 may include various elements, such as the first elements 325 and the second elements 330. As used herein, elements may include data processing functions or structures, data storage functions or structures, or other data processing elements. For example, an element may be a type that identifies, stores, or organizes data used in a source API (e.g., the first source API 310 or the second source API 315). For example, a type may be named "Product," "OrderItem," or "Order," and may contain or be associated with data relating to the type (e.g., product data, order item data, or order data). In some examples, an element (e.g., a type) may also contain one or more sub-elements. Such sub-elements may be fields within a type that may provide data related to the element. For example, an element (e.g., a type) may be a "Country" type that contains data associated with countries, and the element or type may include a sub-element (e.g., a field) indicating, for example, a telephone prefix or a currency associated with the country. In addition, the data values stored in the element may be associated with the sub-element (e.g., field). For example, a data value for a sub-element (e.g., field) of "telephone prefix" may be "+39" and a data value for a sub-element (e.g., field) of "currency" may be "Euro."

In some examples, the federated API manager 305 may generate the federated API schema 320 by identifying, determining, or selecting one or more patterns in the first elements 325 and the second elements 330. A pattern may be an operation defined over elements (e.g., types) in different source APIs (e.g., the first source API 310 and the second source API 315) to combine the elements as a single element in the federated API schema 320. For example, the federated API manager 305 may identify that the first elements 325 and the second elements 330 form a first pattern 335, a second pattern 340, and a third pattern 345. The identification, determination, or selection of such patterns may be accomplished in a variety of ways. For example, the federated API manager 305 may identify, determine, or select elements that may include compatible elements. In some examples, the federated API manager 305 may identify two elements that are included in both the first source API 310 and the second source API 315, and the federated API manager 305 may further identify that the elements contain common sub-elements (e.g., fields). As such, the federated API manager 305 may determine or identify that the two elements are compatible elements.

The federated API manager 305 may deem or determine elements to be compatible by identifying or determining that the elements include compatible element identifiers. For examples, the first elements 325 and the second elements 330 may include elements that have element identifiers with a value of "Monetary Amount." In some examples, the federated API manager 305 may deem or determine elements to be compatible by identifying or determining that the elements include a compatible data type. For example, the federated API manager 305 may determine that the elements associated with the first pattern 335 may include a string data type. In some examples, such compatible element identifiers or compatible data types may be associated with an element composition capability of the federated API manager 305 or the federated API schema 320, as described herein.

In some examples, the federated API manager 305 may deem or determine elements to be compatible by identifying or determining that the elements include a compatible dataset instance identifier. In some examples, a dataset instance identifier may also be known as a key. A key may be any combination of properties that uniquely identify instances of the element. For example, if elements (e.g., elements from the first elements 325 and the second elements 330 that are associated with the first pattern 335) support the same key, information from both elements may be merged. By defining the key, information in a first element may be extended with information from other matching elements. For example, information in a local graph may be extended with information from other data graphs with a matching type, key, and offering a default constructor. Another example may include when a local reference in a first API (e.g., the first source API 310) may refer to data available in a second API (e.g., the second source API 315). In some examples, local information may be provided as a source for queries over multiple data graphs, (e.g., when joining different parts of a type for the same key joining information from multiple APIs). In some examples, such use of keys may be associated with an element extension capability of the federated API manager 305 or the federated API schema 320, as described herein.

In some examples, the federated API manager 305 may deem or determine elements to be compatible by identifying or determining that the elements include a compatible lookup field (e.g., a finder) associated with compatible dataset instance identifier. In some examples, a finder may be a sub-element (e.g., a field) at the top level element (e.g., type) of an individual API that may return single instances of a type. In some examples, a finder or lookup field may give access to a data set for an element (e.g., type) to clients (e.g., query clients). Without a finder, clients may not be able to directly fetch data for a type from an API. However, in some cases, a client may still find that type of data nested in a different type that does have a finder.

In some examples, the federated API manager 305 may deem or determine elements to be compatible by identifying or determining that a first element includes a reference to a second element. For example, if an element of the first elements 325 contains a reference to data associated with another element of the second elements 330, the federated API manager 305 may identify that the elements are compatible, and may also determine that the elements are associated with a pattern (e.g., the first pattern 335, the second pattern 340, or the third pattern 345). In some examples, such use of references may be associated with an element reference capability of the federated API manager 305 or the federated API schema 320, as described herein.

In some examples, the federated API manager 305 may identify, determine, or select compatible elements based on a federation protocol 350. As described herein, the federation protocol may define, identify, or select rules, procedures, configurations, or other parameters that define how the federated API schema 320 may be generated. In some examples, the federation protocol may be regarded as a contract that binds the federated parts, and governs the relationships between the first source API 310 and the second source API 315 and associated API features (e.g., API features 225 as discussed in relation to FIG. 2). In some examples, the federation protocols 350 may capture one or more strategies to federate a set of source API schemas into a final federated API schema. The federation mechanism may be defined through a federation algorithm that may be configured with different federation protocols. The outcome may be a federated schema (e.g., the federated API schema 320) that may describe the combined schema of all the source API schemas or a set of errors in the sources.

In some examples, the federation protocols 350 may be associated with federation metadata. For example, the federation protocols 350 may include various rules, procedures, configurations, or parameters, (e.g., rules concerning names, fields, finders, keys, linking, or extensions) that may define or identify various relationships between the first source API 310 and the second source API 315 to aid in the generation of the federated API schema 320. For example, the federation protocols 350 may establish that elements with the same name in the source APIs may be merged recursively in the federated API schema 320. In some examples, matching elements may be merged, and, in some examples, for each matching pair of elements, matching sub-elements may also be merged.

In some examples, the federation protocols 350 may establish that the federated API schema 320 may include a number of sub-elements (e.g., fields) in an element (e.g., a type). In some examples, the sub-element set (e.g., the field set) in a federated API schema 320 may be the union of the merged sub-elements (e.g., fields) for the element (e.g., type) in each individual API (e.g., the first source API 310 and the second source API 315). In some examples, mandatory sub-elements for an element present in every single individual API may be mandatory in the federated API schema 320. Any other sub-element, mandatory or optional, in the source APIs become optional in the federated schema. In some examples, finders cannot be merged, and are instead renamed.

In some examples, the federation protocols 350 may establish that the data set containing all the instances for a type in the federated schema may be the union of the data sets for the types in the individual APIs. In some examples, finders in the federated schema give access to the subset of the instances accessible through that finder.

In some examples, the federation protocols 350 may establish that a key or dataset instance identifier may be a sub-element (e.g., field) in an element (e.g., type) chosen by the API owner to uniquely identify each instance of that element. For each value of the key there may be only one resource in any given API. In some examples, multiple fields in an element may be candidate keys. In some examples, one key may be picked by the API owner as the designated key. In some examples, keys allow a federation layer or federated API schema 320 to join data with the same key in a query or other federated operation (e.g., the first federated operation 355).

In some examples, the federation protocols 350 may establish a requirement for default finder, which may be a finder field used to perform data lookups by key over the data set of an element. In some examples, multiple finders could be the default finders. In some examples, default finders allow the federated API schema 320 to look up for data from the different individual APIs that may be joined when executing a query or other federated operation.

In some examples, the federation protocols 350 may establish that if a dataset instance identifier (e.g., a key) is defined for one type in an API, every source API may define the same dataset instance identifier or key for that type. In some examples, the source APIs may support the same dataset (e.g., key id=1 must be available in all APIs extending the element with mandatory fields). In some examples, the same value for a dataset instance identifier and element identifies the same information in some or all source APIs in the federated API schema 320 (e.g., customers with key id=1 may identify the same customer in any API supporting the customer element). In some examples, some or all of the source APIs providing one or more lookup fields (e.g., finders) for an element with a defined dataset instance identifier (e.g., a key) may define at least one default lookup field. In some examples, default lookup fields may be merged.

In some examples, the federation protocols 350 may establish that if a dataset instance identifier (e.g., key) is defined for an element (e.g., type) all the data instances for that type may be joined by the dataset instance identifier in the federated API schema 320, instead of being added as a union. In some examples, common fields provided by more than one source API, that are not keys, may have the same values for an instance identified by the dataset instance identifier in all the APIs. In some examples, fields provided by only one source API may appear in the federated schema with the same type of access they have in the individual source API (e.g., mandatory or optional).

In some examples, the federation protocols 350 may establish that a reference may not extend an element. In some examples, references may not introduce new sub-elements not provided already by another source API that may define a default lookup field for the element. In some examples, references may be merged into the federated API schema 320 just as other elements may be merged into the federated API schema 320.

Though examples of federation protocols are provided herein, these examples should be interpreted as examples only, and should not limit the scope of possible federation protocols.

In some examples, the federation protocols 350 may establish parameters, configurations, or rules about reference capabilities. In some examples, references may not extend an element. For example, a reference may not introduce new fields not provided already by other source APIs. In some examples, references are merged into the federated schema as any other type definition.

In some examples, the federated API manager 305 may identify, determine, select, or create one or more federated operations (e.g., the first federated operation 355, the second federated operation 360, or the third federation operation 365). In some examples, the first federated operation 355, the second federated operation 360, and the third federation operation 365 may be associated with the first pattern 335, the second pattern 340, and the third pattern 345, respectively. For example, based on the identification of the first pattern 335, the second pattern 340, and the third pattern 345 in the first elements 325 and the second elements 330, the federated API manager 305 may identify, determine, select, or create the first federated operation 355, the second federated operation 360, and the third federation operation 365.

In some examples, the federated operations may be operations that may be accessible to a client that may be consuming the federated API schema 320. For example, the first federated operation 355 may be a query operation that may retrieve customer information based on an input provided to the first federated operation 355. Based on such a first federated operation 355, the federated API schema 320 may retrieve the requested customer information that may be stored or associated with one or more elements of the first elements 325 of the first source API 310 and the second elements 330 of the second source API 315. Thus, the client may be accessing data, features, functions, or information through the federated API schema 320.

In some examples, the federated API manager 305 may identify, determine, select, or create a federated operation (e.g., the first federated operation 355, the second federated operation 360, or the third federated operation 365) based on one or more federation operation rules 370. In some examples, the federated operation rules 370 may include configurations, rules, procedures, or parameters that may define, determine, or affect how the federated operations may be identified, determined, selected, or created. For example, a federated operation rule 370 may establish that a federated operation that receives a string as an input from a client may require that information or values returned to the client also be formatted as a string. As such, based on the federated operation rule 370, a federated operation (e.g., the first federated operation 355) may include a data transformation that may transform data retrieved from a source API (e.g., the first source API 310) from an integer data type to a string data type to comply with the requirement of the federation operation rules. Many other rules, configurations, procedures, and parameters may also be included in the federation operation rules, and the provided example discusses only one possibility out of many.

In some examples, the federated API manager 305 may generate the federated API schema 320 based on the federated operation rules 370. For example, the federated operation rules 370 may define or determine how various federated operations (e.g., the first federated operation 355, the second federated operation 360, or the third federation operation 365) may interact with one another. For example, the third federated operation 365 may also invoke the second federated operation 360 for data retrieval (as one of many possible examples). Such an interaction may be governed or affected by the federation operation rules 370.

In some examples, the federated API manager 305 may generate the federated API schema 320 generating one or more federated elements. The federated elements may be similar to first elements 325 or second elements 330, except that the federated elements may have been extended, composed, referenced, or modified based on the identified patterns (e.g., the first pattern 335, the second pattern 340, or the third pattern 345). For example, the federation protocols 350, the federation operation rules 370, or both may allow the first source API 310 and the second source API 315 to collaborate through various capabilities, including extension, reference, and composition. Extension and reference may rely on the definition of keys for the different elements (e.g., types), allowing the API Federation service to join and link data provided by the individual source APIs (e.g., the first source API 310 and the second source API 315). Composition may merge elements (e.g., as a default option) if no keys are defined. The generation, identification, or selection of such federated elements through extension, reference, and composition is additionally discussed in FIGS. 4-6 herein.

In some examples, the federated API manager 305 may generate the federated API schema 320 through use of a federation algorithm. The federation algorithm may include various steps, rules, analyses, procedures, operations, determinations, selections, or other elements that may be used to generate the federated API schema 320. For example, the federation algorithm may be defined as a function that receives a federation protocol and a set of canonical API schemas and returns a federated API schema (e.g., the federated API schema 320) with an associated set of errors. In some examples, the federation algorithm may use information in the individual source schemas and may not rely on any metadata stored at the federated level.

In one exemplary federation algorithm, the federated API manager 305 may initialize the federated API schema 320 with a null schema including an empty set of elements (e.g., types) and errors. The federated API manager 305 may iterate through all canonical source API schemas (e.g., the first source API 310 and the second source API 315). The federated API manager 305 may iterate through all elements (e.g., elements (e.g., types)) in each canonical source API schema.

If there is an element (e.g., type) in the federated schema with a matching name, the federated API manager 305 may execute various actions. If the action defined in the federation protocol for both elements (e.g., type) is an error, the federated API manager 305 may add the error to the list of errors in the federated schema. If the action defined in the federation protocol for both element (e.g., type) is a rewrite operation, the federated API manager 305 may add the rewritten element (e.g., type) to the set of elements (e.g., types) in the canonical source API schema. If the action defined in the federation protocol for both elements (e.g., types) is a composition action, the federated API manager 305 may add the composed element (e.g., type) to the set of elements (e.g., types) in the federated schema and may add all operations from the canonical source returning the composed element (e.g., type) to the set of operations in the federated schema. If the action defined in the federation protocol for both elements (e.g., types) is an extension action, the federated API manager 305 may add the extended element (e.g., type) to the set of elements (e.g., types) in the federated schema, and may add all element (e.g., type) resolvers from the canonical source returning the extended element (e.g., type) to the set of operations in the federated schema. If the action defined in the federation protocol for both elements (e.g., types) is a reference or link action, the federated API manager 305 may, for all sub-elements (e.g., fields) in the federated schema returning the reference element (e.g., type) being linked, rewrite them to return the element (e.g., type) referenced.

However, if there is not matching element (e.g., type) defined in the federated schema, the federated API manager 305 may add the element (e.g., type) to the set of elements (e.g., types) in the federated schema.

In some examples, the federated API manager 305 may then return the federated schema after iterating through all of the canonical source API schemas.

In some examples, the federated API manager 305 may perform a consistency check or error checking on the generated federated API schema 320 to ensure that the federated API schema 320 functions properly and correctly incorporates and combines the various sources APIs. In some examples, a consistency check may include the process of checking if one individual source API schema may be added to the federated schema without violating the federation protocol. In some examples, a consistency check may work with the information of the individual API schema metadata and the federated API schema 320 metadata. For example, a consistency check may include determining whether a matching element exists in the federated API schema 320 that matches an element in a candidate source API. Such a consistency check may also include determining whether a dataset instance identifier (e.g., a key) is found in the federated API schema 320 or in the candidate source API. In some examples, a consistency check may include determining whether there are new sub-elements (e.g., fields) in the candidate source API. In some examples, a consistency check may include determining whether there are compatible sub-elements between the federated API schema 320 and the candidate source API. Further, in some examples, a consistency check may include determining whether a default lookup field (e.g., finder) may be defined or found in the candidate source API.

In some examples, the federated API manager 305 may identify one or more federation errors arising in the federated API schema 320, and the federated API manager 305 may perform a conflict resolution operation to resolve one or more federation errors. For example, the federated API manager 305 may rename an element (e.g., a type) or a sub-element (e.g., a field). Additionally, or alternatively, the federated API manager 305 may hide an element (e.g., a type) or a sub-element (e.g., a field).

Figure 4:
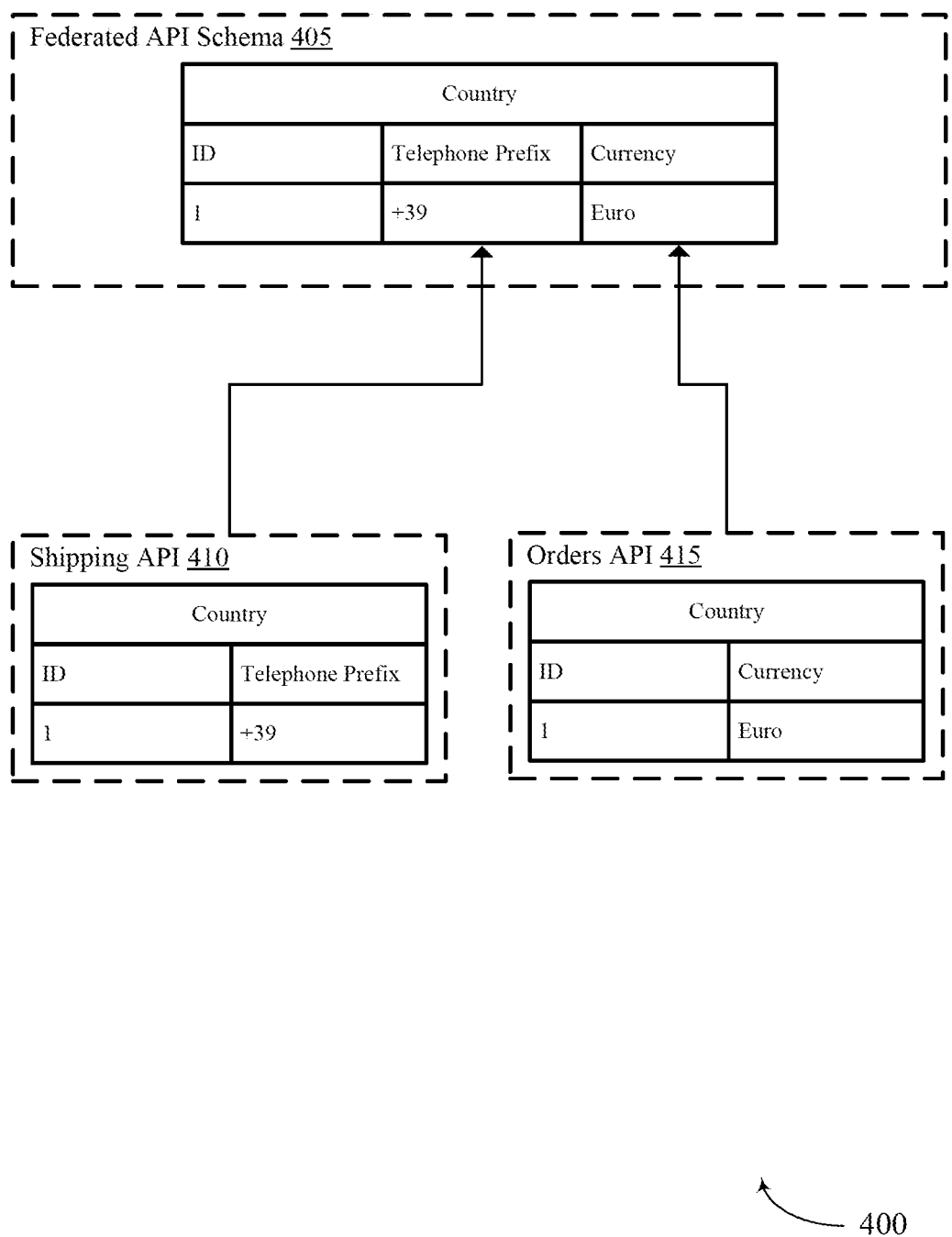
FIG. 4 illustrates an example of an extension capability that supports feature based application programming interface federation in accordance with aspects of the present disclosure.

FIG. 4 illustrates an example of an extension capability 400 that supports feature based application programming interface federation in accordance with aspects of the present disclosure. In some examples, a federated API schema 405 may be generated based on source APIs, such as the shipping API 410 and the orders API 415. The shipping API 410 and the orders API 415 are only examples of possible source APIs, and the description of the extension capability herein is not limited to this particular example. Rather, the principles and approaches described herein may be applied to any number and any type of source API.

In some examples, element extension (or type extension) may enrich the same element or type of information providing new fields for the element or type in the federated API schema 405. In some examples of element extension, individual APIs may provide a network endpoint to access directly the element or type data. Individual APIs may act as providers of information, and the federated API schema may join the data from the different providers through a shared key for the federated element or type.

For example, the shipping API 410 and the orders API 415 may both include an element or type named "Country." The shipping API 410 and the orders API 415 may both include a common dataset instance identifier or key (e.g., an ID of "1"). As described herein, a key may be any combination of properties that uniquely identify instances of the element. However, the shipping API 410 element may include a telephone prefix associated with the dataset instance identifier or key, and the orders API 415 may include a currency associated with the same dataset instance identifier or key. Thus, the country element of the shipping API 410 and the country element of the orders API 415 may form a pattern (e.g., the first pattern 335 as discussed in relation to FIG. 3) and may be extended. In some examples, extension may include combining new fields from the various source APIs (e.g., the shipping API 410 and the orders API 415) to provide better information to the client interfacing with the federated API schema 405. As such, the federated API schema 405 may contain or be associated with the fields and information from the shipping API 410 and the orders API 415. In some examples, a new federated element (e.g., the country element of the federated API schema 405) may be generated, determined, or identified as part of the generation of the federated API schema 405.

Figure 5:
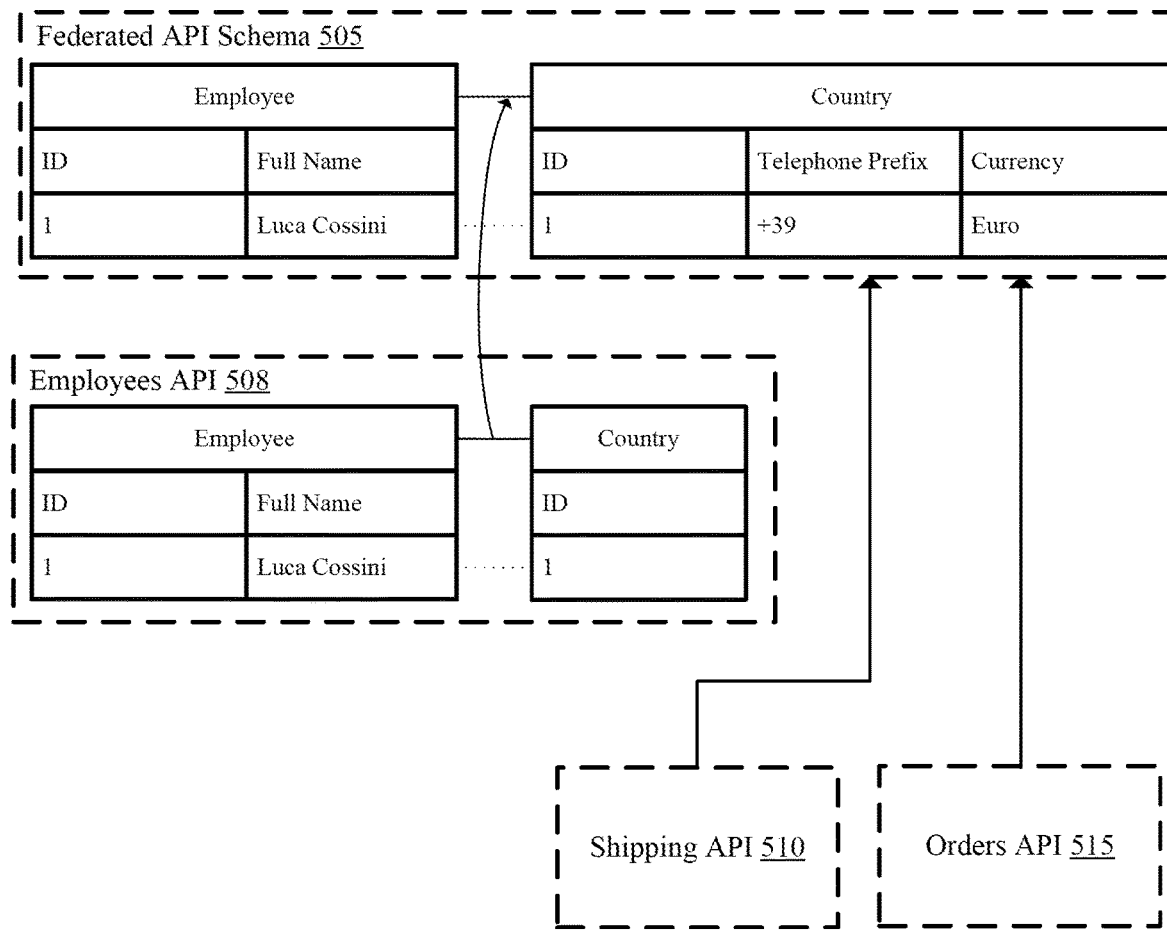
FIG. 5 illustrates an example of a reference capability that supports feature based application programming interface federation in accordance with aspects of the present disclosure.

FIG. 5 illustrates an example of a reference capability 500 that supports feature based application programming interface federation in accordance with aspects of the present disclosure. In some examples, a federated API schema 505 may be generated based on source APIs, such as the employees API 508, the shipping API 510 and the orders API 515. The shipping API 510 may be an example of the shipping API 410 discussed in relation to FIG. 4, and the orders API 515 may be an example of the orders API 415 discussed in relation to FIG. 4. It should be noted that the shipping API 510 and the orders API 515 are only examples of possible source APIs, and the description of the extension capability herein is not limited to this particular example. Rather, the principles and approaches described herein may be applied to any number and any type of source API.

In some examples, element references (e.g., type references) may connect different items of information in the federated API schema 505 by holding a reference to the target element key (e.g., type key) in the individual API schema (e.g., the employees API 508). For example, a reference (or linking) function may be a function defined for a pair of compatible type reference and network addressable elements (e.g., types) with a common key that may combine the elements into an image element referencing or linking the element holding the reference to the target element. In some examples, individual APIs (e.g., the employees API 508) must contain a reference or embedded foreign key or dataset instance identifier. In some examples, a federated API manager may resolve the references, effectively linking information from multiple APIs. In some examples, reference capabilities may also be known as linking capabilities.

For example, in the employees API 508, the employee element may contain a reference to a country element, and the employee element and the country element may both contain the same key (e.g., an ID of "1"). As such, the reference may be used to connect the employee element and the country element from the employees API 508 with the additional country information from the shipping API 510 and the orders API 515 (e.g., the information appearing in the country element of the federated API schema 505 and as shown in relation to the shipping API 410 and the orders API 415 discussed in relation to FIG. 4). As such, the employee and country elements of the federated API schema 505 are enriched with information from the various source APIs.

In some examples, as part of the generation of the federated API schema 505, an operation for retrieval of the first element of a first source API (e.g., the employee element of the employees API 508) may be replaced with an operation for retrieval of the first element of a second source API (e.g., the country element of the shipping API 510 or the orders API 515). Alternatively, or additionally, an operation for retrieval of retrieval of a target of a reference (e.g., the reference from the employee element of the employees API 508 to the country element of the employees API 508) may be replaced with an operation for retrieval of an enriched element of a federated API schema (e.g., the country element of the federated API schema 505).

Figure 6:
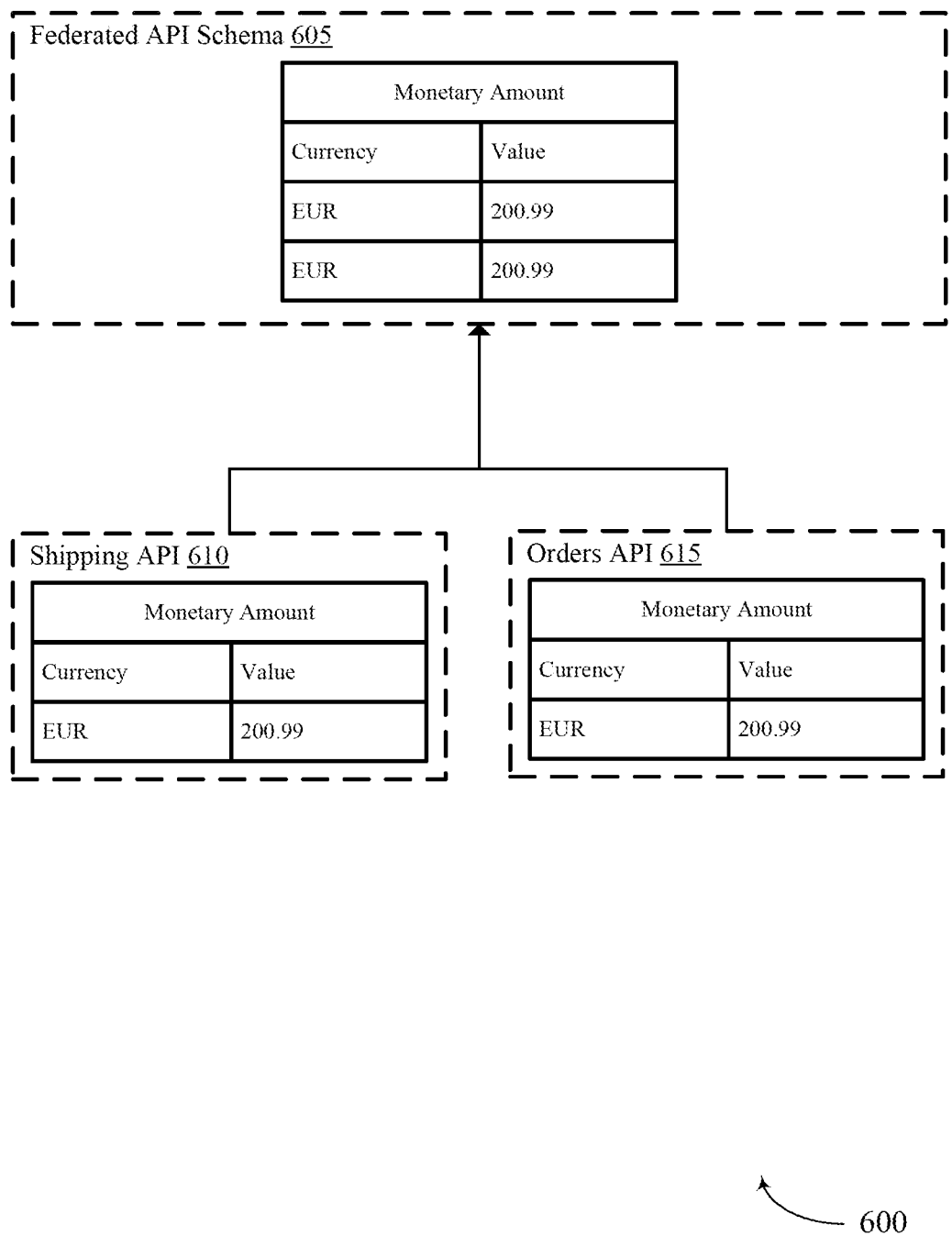
FIG. 6 illustrates an example of a composition capability that supports feature based application programming interface federation in accordance with aspects of the present disclosure.

FIG. 6 illustrates an example of a composition capability 600 that supports feature based application programming interface federation in accordance with aspects of the present disclosure. In some examples, a federated API schema 605 may be generated based on source APIs, such as the shipping API 610 and the orders API 615. The shipping API 610 may be an example of the shipping API 410 or shipping API 510 discussed in relation to FIGS. 4 and 5, and the orders API 615 may be an example of the orders API 415 or the orders API 515 discussed in relation to FIGS. 4 and 5. The shipping API 610 and the orders API 615 are only examples of possible source APIs, and the description of the extension capability herein is not limited to this particular example. Rather, the principles and approaches described herein may be applied to any number and any type of source API.

In some examples, composition may be used to generate federated elements in the federated API schema 605 where no individual source has provided a key. In some examples, a key may be not provided because the information may be a value object, or because there is no join of information. As such, element composition (e.g., type composition) may be utilized to enrich a federated element (e.g., federated type).

As shown in FIG. 6, both the shipping API 610 and the orders API 615 may include a "monetary amount" element, and each element (e.g., type) may include a sub-element (e.g., field) of "value" and associated data ("200.99"). Through composition, the sub-elements (e.g., fields) that have matching names may be recognized, and the associated data from both the shipping API 610 and the orders API 615 may be combined under the same sub-element in federated element "monetary amount" in the federated API schema 605.

Figure 7:
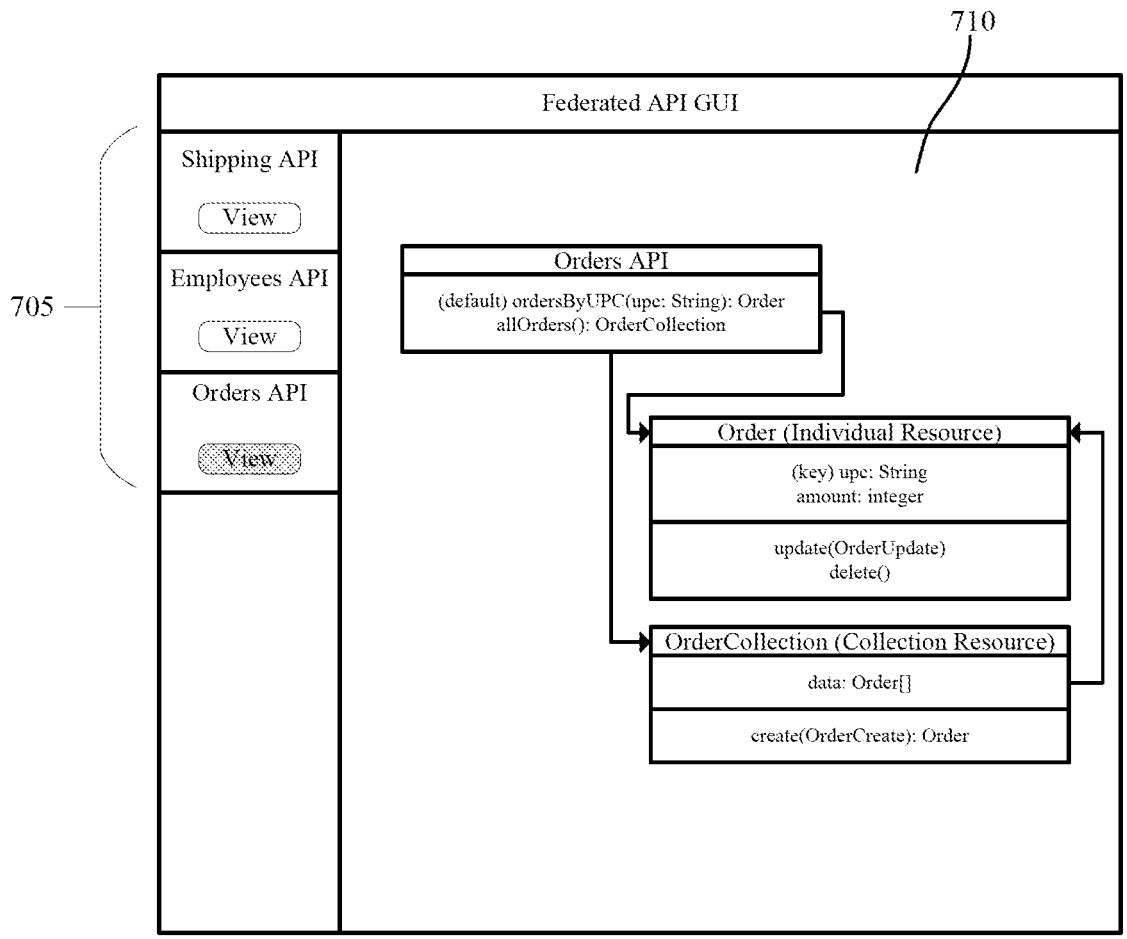
FIG. 7 illustrates an example of a graphical user interface that supports feature based application programming interface federation in accordance with aspects of the present disclosure.

FIG. 7 illustrates an example of a graphical user interface 700 that supports feature based application programming interface federation in accordance with aspects of the present disclosure. In some examples, the graphical user interface (GUI) 700 may include an interface through which a user may view various source APIs, elements, sub-elements, patterns, and other aspects of the approaches described herein. Through the GUI 700, the user may transmit user input to the federated API manager for federation of the various source APIs into a federated API. Similarly, the federated API manager may also report errors, provide suggestions or recommendations (e.g., recommendations for error resolution), or other notifications, updates, message, or information to the user through the GUI 700.

For example, in GUI 700, various source APIs may be viewed through the source API selection area 705. In this particular example, a user may be viewing the orders API. In the main display area 710, information about the selected orders API may be displayed. For example, the GUI may display information about the orders API's individual resources, and collective resources. Such information may be helpful to a user during the process of transmitting information to a federated API manager that may generate a federated API through the approaches described herein.

Figure 8:
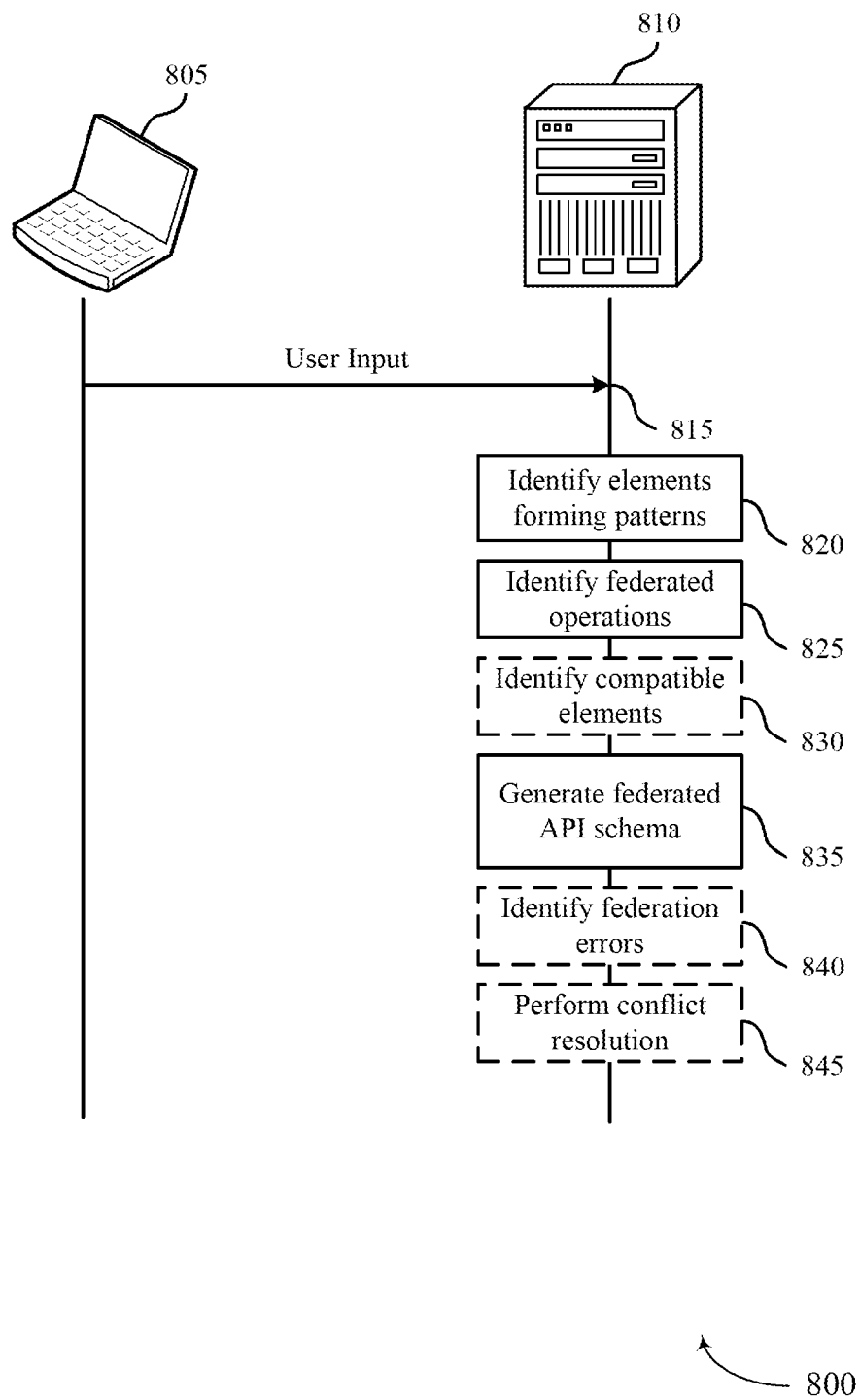
FIG. 8 illustrates an example of a process flow that supports feature based application programming interface federation in accordance with aspects of the present disclosure.

FIG. 8 illustrates an example of a process flow 800 that supports feature based application programming interface federation in accordance with aspects of the present disclosure. The process flow 800 may implement various aspects of the present disclosure described with reference to FIGS. 1-3. The process flow 800 may include a client 805 and an application server 810, which may be examples of the clients 105 and 205 and federated API manager 212 and 305 as described with reference to FIGS. 1-3.

In the following description of the process flow 800, the operations between the client 805 and the application server 810 may be performed in different orders or at different times. Some operations may also be left out of the process flow 800, or other operations may be added. Although the client 805 and the application server 810 are shown performing the operations of the process flow 800, some aspects of some operations may also be performed by one or more other wireless devices.

At 815, the application server 810 may receive, via a user interface of the federated API manager, first user input indicating a first source API and a second source API for generating a federated API. The first source API and the second source API may each include one or more features for data processing.

At 820, the application server 810 may identify, by the federated API manager, elements that may form one or more patterns from the one or more features of the first source API and the one or more features of the second source API based on one or more federation protocols.

At 825, the application server 810 may identify, by the federated API manager, one or more federated operations based on the identified one or more elements and one or more federated operation rules.

At 830, the application server 810 may identify that a first element of the first source API and a first element of the second source API are compatible elements. In some examples, identifying that the first element of the first source API and the first element of the second source API are compatible elements may include identifying that the first element of the first source API and the first element of the second source API each include a compatible element identifier. In some examples, identifying that the first element of the first source API and the first element of the second source API are compatible elements may include identifying that the first element of the first source API and the first element of the second source API each include a compatible data type. In some examples, identifying that the first element of the first source API and the first element of the second source API are compatible elements may include identifying that the first element of the first source API and the first element of the second source API each include a compatible dataset instance identifier. In some examples, identifying that the first element of the first source API and the first element of the second source API are compatible elements may include identifying that the first element of the first source API and the first element of the second source API each include a compatible lookup field associated with the compatible dataset instance identifier. In some examples, identifying that the first element of the first source API and the first element of the second source API are compatible elements may include identifying that the first element of the first source API includes a reference that is compatible with the first element of the second source API.

At 835, the application server 810 may generate, by the federated API manager, the federated API schema based on the one or more federated operation rules. The federated API schema may expose the one or more federated operations. In some examples, generating the federated API schema may include generating a federated element comprising the union of a set of sub-elements of the first element of the first source API and a set of sub-elements of the first element of the second source API. In some examples, generating the federated API schema may include replacing an operation for retrieval of the first element of the first source API with an operation for retrieval of the first element of the second source API. In some examples, generating the federated API schema may be based on the one or more federated operations.

At 840, the application server 810 may identify, by the federated API manager, one or more federation errors arising in the federated API schema. In some examples, the application server 810 may determine whether a schema of the first source API or the second source API violates the one or more federation operation rules.

At 845, the application server 810 may perform a conflict resolution operation to resolve at least one of the one or more federation errors. In some examples, the conflict resolution operation may include renaming an element, renaming a sub-element of an element, hiding an element, hiding a sub-element, or any combination thereof.

Figure 9:
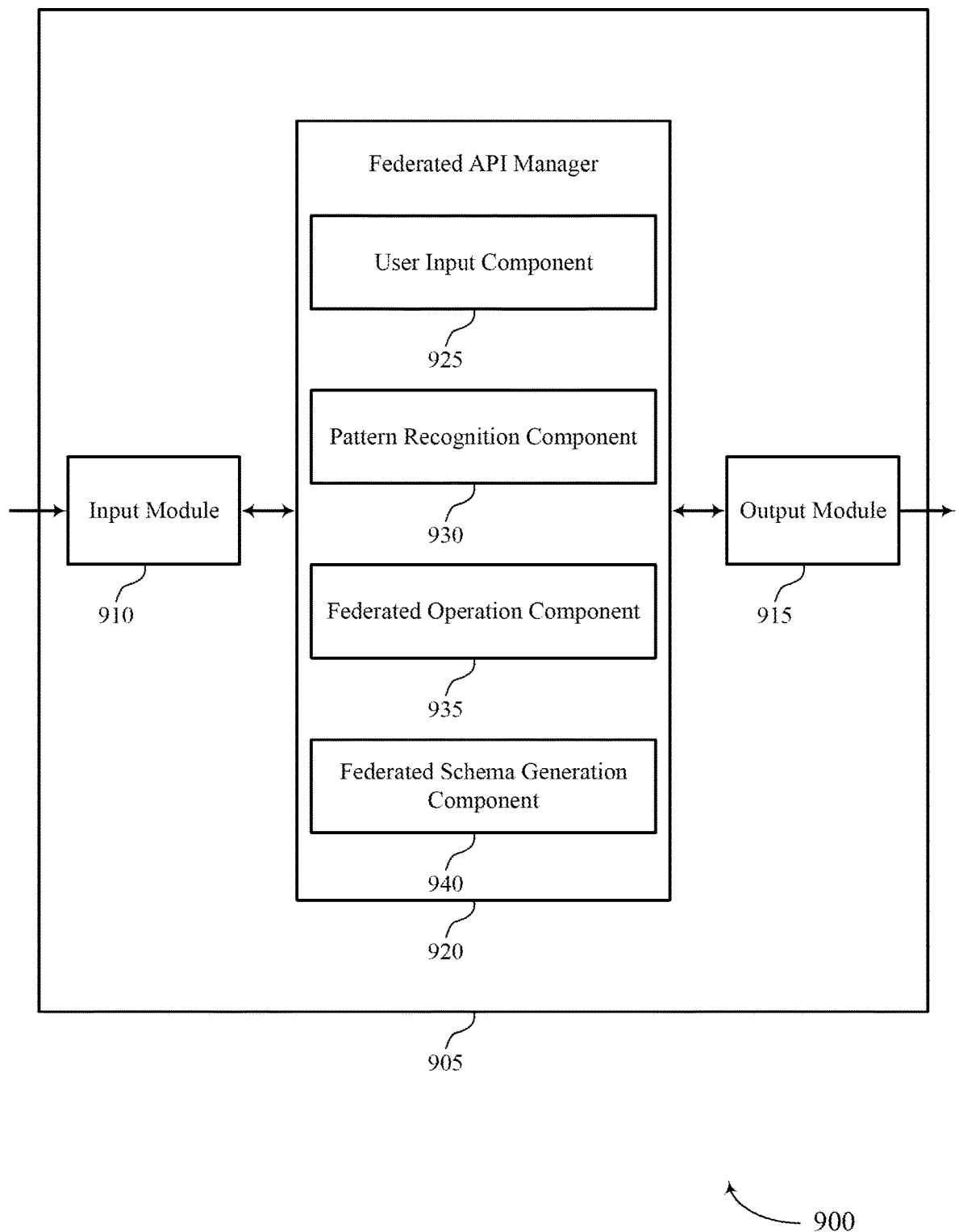
FIG. 9 shows a block diagram of an apparatus that supports feature based application programming interface federation in accordance with aspects of the present disclosure.

FIG. 9 shows a block diagram 900 of a device 905 that supports feature based application programming interface federation in accordance with aspects of the present disclosure. The device 905 may include an input module 910, an output module 915, and a federated API manager 920. The device 905 may also include a processor. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the federated API manager 920 to support feature based application programming interface federation. In some cases, the input module 910 may be a component of an I/O controller 1110 as described with reference to FIG. 11.

The output module 915 may manage output signals for the device 905. For example, the output module 915 may receive signals from other components of the device 905, such as the federated API manager 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of an I/O controller 1110 as described with reference to FIG. 11.

For example, the federated API manager 920 may include a user input component 925, a pattern recognition component 930, a federated operation component 935, a federated schema generation component 940, or any combination thereof. In some examples, the federated API manager 920, or various components thereof, may be configured to perform various operations (e.g., receiving, monitoring, transmitting) using or otherwise in cooperation with the input module 910, the output module 915, or both. For example, the federated API manager 920 may receive information from the input module 910, send information to the output module 915, or be integrated in combination with the input module 910, the output module 915, or both to receive information, transmit information, or perform various other operations as described herein.

The federated API manager 920 may support generating a federated API schema by a federated API manager in accordance with examples as disclosed herein. The user input component 925 may be configured as or otherwise support a means for receiving, via a user interface of the federated API manager, first user input indicating a first source API and a second source API for generating a federated API, wherein the first source API and the second source API each comprise one or more features for data processing. The pattern recognition component 930 may be configured as or otherwise support a means for identifying, by the federated API manager, elements forming one or more patterns from the one or more features of the first source API and the one or more features of the second source API based at least in part on one or more federation protocols. The federated operation component 935 may be configured as or otherwise support a means for identifying, by the federated API manager, one or more federated operations based at least in part on the identified one or more elements and one or more federated operation rules. The federated schema generation component 940 may be configured as or otherwise support a means for generating, by the federated API manager, the federated API schema based at least in part on the one or more federated operation rules, the federated API schema exposing the one or more federated operations.

Figure 10:
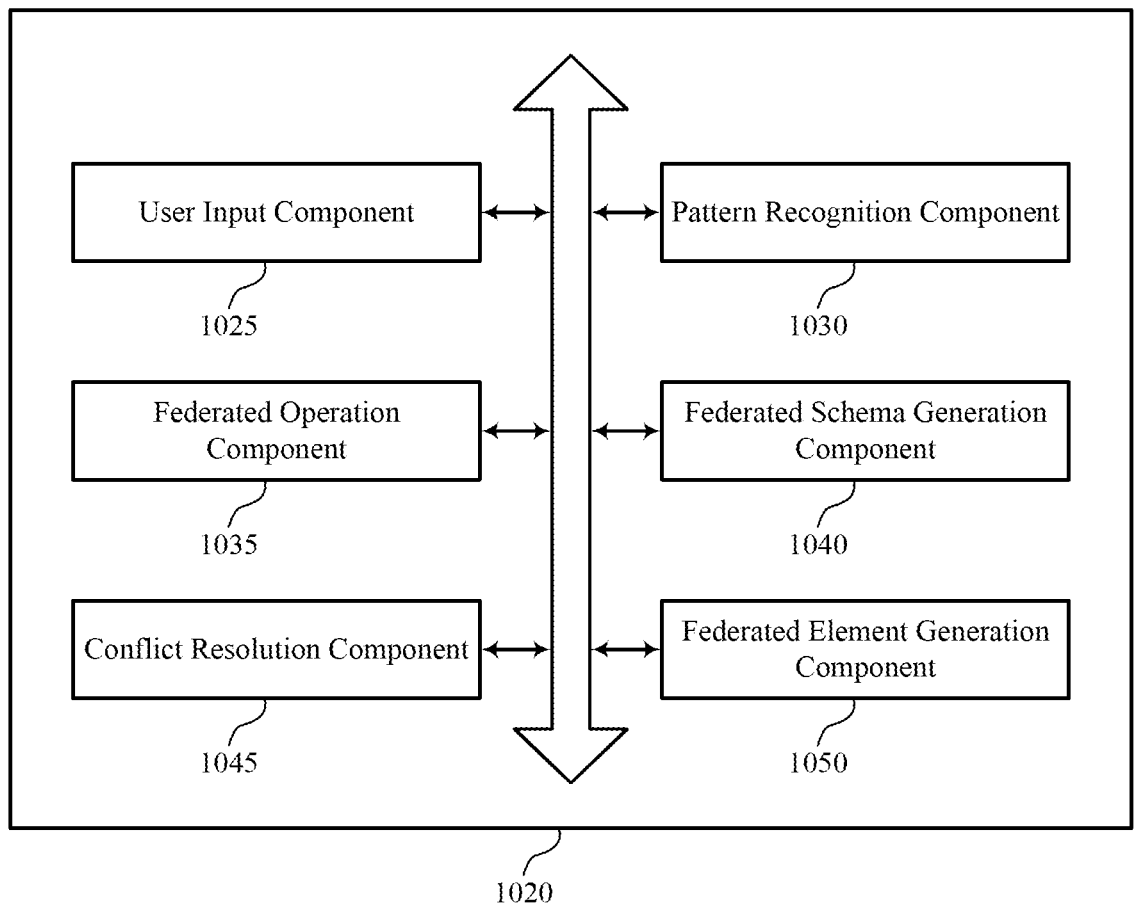
FIG. 10 shows a block diagram of a federated API manager that supports feature based application programming interface federation in accordance with aspects of the present disclosure.

FIG. 10 shows a block diagram 1000 of a federated API manager 1020 that supports feature based application programming interface federation in accordance with aspects of the present disclosure. The federated API manager 1020 may be an example of aspects of a federated API manager or a federated API manager 920, or both, as described herein.

The federated API manager 1020, or various components thereof, may be an example of means for performing various aspects of feature based application programming interface federation as described herein. For example, the federated API manager 1020 may include a user input component 1025, a pattern recognition component 1030, a federated operation component 1035, a federated schema generation component 1040, a conflict resolution component 1045, a federated element generation component 1050, or any combination thereof. Each of these components may communicate, directly or indirectly, with one another (e.g., via one or more buses).

The federated API manager 1020 may support generating a federated API schema by a federated API manager in accordance with examples as disclosed herein. The user input component 1025 may be configured as or otherwise support a means for receiving, via a user interface of the federated API manager, first user input indicating a first source API and a second source API for generating a federated API, wherein the first source API and the second source API each comprise one or more features for data processing. The pattern recognition component 1030 may be configured as or otherwise support a means for identifying, by the federated API manager, elements forming one or more patterns from the one or more features of the first source API and the one or more features of the second source API based at least in part on one or more federation protocols. The federated operation component 1035 may be configured as or otherwise support a means for identifying, by the federated API manager, one or more federated operations based at least in part on the identified one or more elements and one or more federated operation rules. The federated schema generation component 1040 may be configured as or otherwise support a means for generating, by the federated API manager, the federated API schema based at least in part on the one or more federated operation rules, the federated API schema exposing the one or more federated operations.

In some examples, to support identifying, by the federated API manager, elements forming one or more patterns, the pattern recognition component 1030 may be configured as or otherwise support a means for identifying that a first element of the first source API and a first element of the second source API are compatible elements.

In some examples, to support identifying that the first element of the first source API and the first element of the second source API are compatible elements, the pattern recognition component 1030 may be configured as or otherwise support a means for identifying that the first element of the first source API and the first element of the second source API each comprise a compatible element identifier.

In some examples, to support generating the federated API schema, the federated element generation component 1050 may be configured as or otherwise support a means for generating a federated element comprising the union of a set of sub-elements of the first element of the first source API and a set of sub-elements of the first element of the second source API.

In some examples, to support identifying that the first element of the first source API and the first element of the second source API are compatible elements, the pattern recognition component 1030 may be configured as or otherwise support a means for identifying that the first element of the first source API and the first element of the second source API each comprise a compatible data type.

In some examples, to support identifying that the first element of the first source API and the first element of the second source API are compatible elements, the pattern recognition component 1030 may be configured as or otherwise support a means for identifying that the first element of the first source API and the first element of the second source API each comprise a compatible dataset instance identifier.

In some examples, to support generating the federated API schema, the federated element generation component 1050 may be configured as or otherwise support a means for generating a federated element comprising the union of a set of sub-elements of the first element of the first source API and a set of sub-elements of the first element of the second source API.

In some examples, to support identifying that the first element of the first source API and the first element of the second source API are compatible elements, the pattern recognition component 1030 may be configured as or otherwise support a means for identifying that the first element of the first source API and the first element of the second source API each comprise a compatible lookup field associated with the compatible dataset instance identifier.

In some examples, to support identifying that the first element of the first source API and the first element of the second source API are compatible elements, the pattern recognition component 1030 may be configured as or otherwise support a means for identifying that the first element of the first source API comprises a reference that is compatible with the first element of the second source API.

In some examples, to support generating the federated API schema, the federated schema generation component 1040 may be configured as or otherwise support a means for replacing an operation for retrieval of the first element of the first source API with an operation for retrieval of the first element of the second source API.

In some examples, the conflict resolution component 1045 may be configured as or otherwise support a means for identifying, by the federated API manager, one or more federation errors arising in the federated API schema. In some examples, the conflict resolution component 1045 may be configured as or otherwise support a means for performing a conflict resolution operation to resolve at least one of the one or more federation errors.

In some examples, the conflict resolution operation comprises renaming an element, renaming a sub-element of an element, hiding an element, hiding a sub-element, or any combination thereof.

In some examples, the conflict resolution component 1045 may be configured as or otherwise support a means for determining whether a schema of the first source API or the second source API violates the one or more federation operation rules.

In some examples, generating the federated API schema is further based at least in part on the one or more federated operations.

Figure 11:
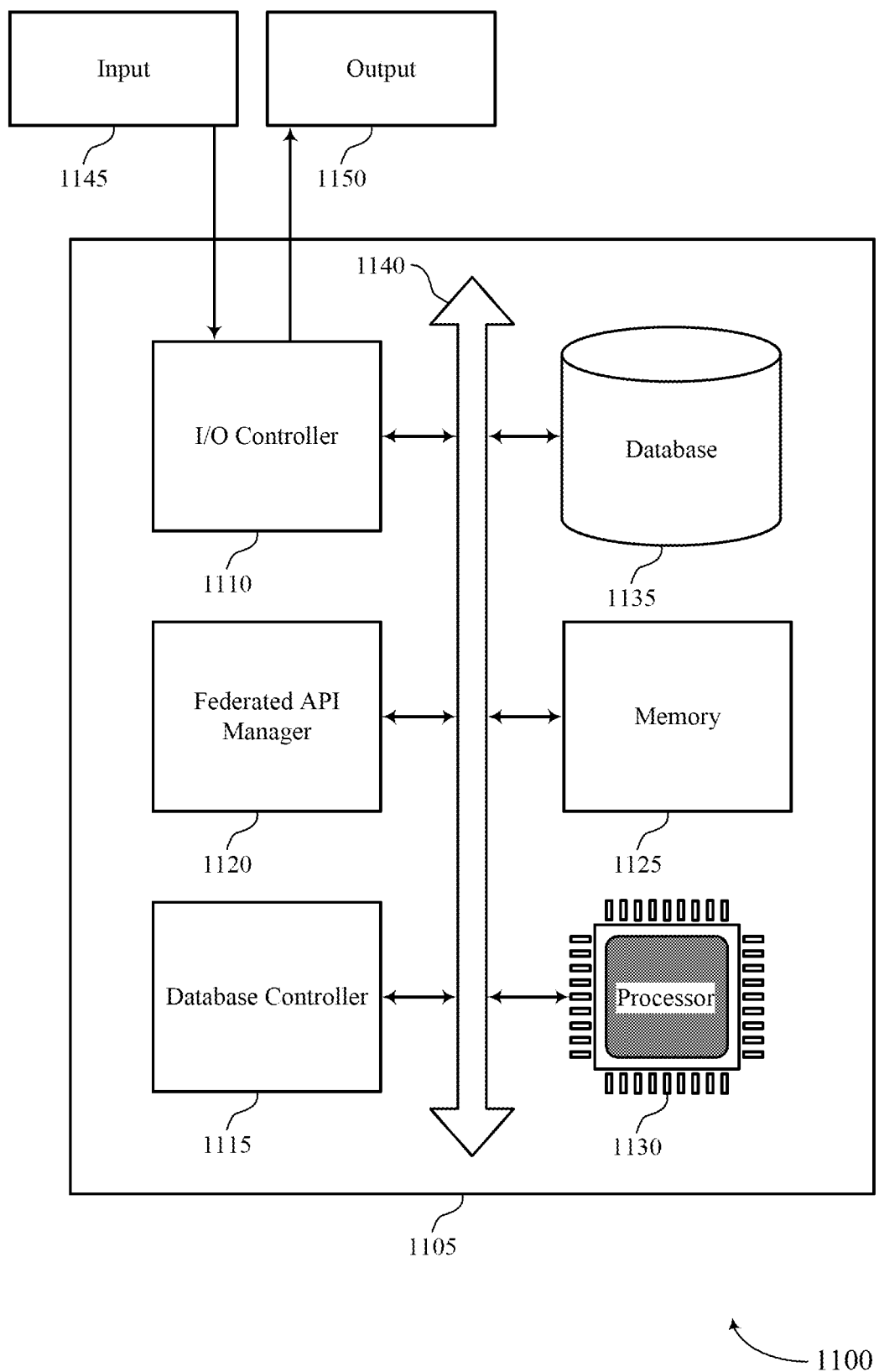
FIG. 11 shows a diagram of a system including a device that supports feature based application programming interface federation in accordance with aspects of the present disclosure.

FIG. 11 shows a diagram of a system 1100 including a device 1105 that supports feature based application programming interface federation in accordance with aspects of the present disclosure. The device 1105 may be an example of or include the components of a device 905 as described herein. The device 1105 may include components for bi-directional data communications including components for transmitting and receiving communications, such as a federated API manager 1120, an I/O controller 1110, a database controller 1115, a memory 1125, a processor 1130, and a database 1135. These components may be in electronic communication or otherwise coupled (e.g., operatively, communicatively, functionally, electronically, electrically) via one or more buses (e.g., a bus 1140).

The I/O controller 1110 may manage input signals 1145 and output signals 1150 for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In other cases, the I/O controller 1110 may represent or interact with a modem, a keyboard, a mouse, a touchscreen, or a similar device. In some cases, the I/O controller 1110 may be implemented as part of a processor 1130. In some examples, a user may interact with the device 1105 via the I/O controller 1110 or via hardware components controlled by the I/O controller 1110.

The database controller 1115 may manage data storage and processing in a database 1135. In some cases, a user may interact with the database controller 1115. In other cases, the database controller 1115 may operate automatically without user interaction. The database 1135 may be an example of a single database, a distributed database, multiple distributed databases, a data store, a data lake, or an emergency backup database.

Memory 1125 may include random-access memory (RAM) and ROM. The memory 1125 may store computer-readable, computer-executable software including instructions that, when executed, cause the processor 1130 to perform various functions described herein. In some cases, the memory 1125 may contain, among other things, a BIOS which may control basic hardware or software operation such as the interaction with peripheral components or devices.

The processor 1130 may include an intelligent hardware device, (e.g., a general-purpose processor, a DSP, a CPU, a microcontroller, an ASIC, a field-programmable gate array (FPGA), a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting feature based application programming interface federation).

The federated API manager 1120 may support generating a federated API schema by a federated API manager in accordance with examples as disclosed herein. For example, the federated API manager 1120 may be configured as or otherwise support a means for receiving, via a user interface of the federated API manager, first user input indicating a first source API and a second source API for generating a federated API, wherein the first source API and the second source API each comprise one or more features for data processing. The federated API manager 1120 may be configured as or otherwise support a means for identifying, by the federated API manager, elements forming one or more patterns from the one or more features of the first source API and the one or more features of the second source API based at least in part on one or more federation protocols. The federated API manager 1120 may be configured as or otherwise support a means for identifying, by the federated API manager, one or more federated operations based at least in part on the identified one or more elements and one or more federated operation rules. The federated API manager 1120 may be configured as or otherwise support a means for generating, by the federated API manager, the federated API schema basing at least in part on the one or more federated operation rules, the federated API schema exposing the one or more federated operations.

By including or configuring the federated API manager 1120 in accordance with examples as described herein, the device 1105 may support techniques for improved user experience related to reduced processing, more efficient utilization of data processing resources, improved coordination between devices, or improved utilization of processing capability.

Figure 12:
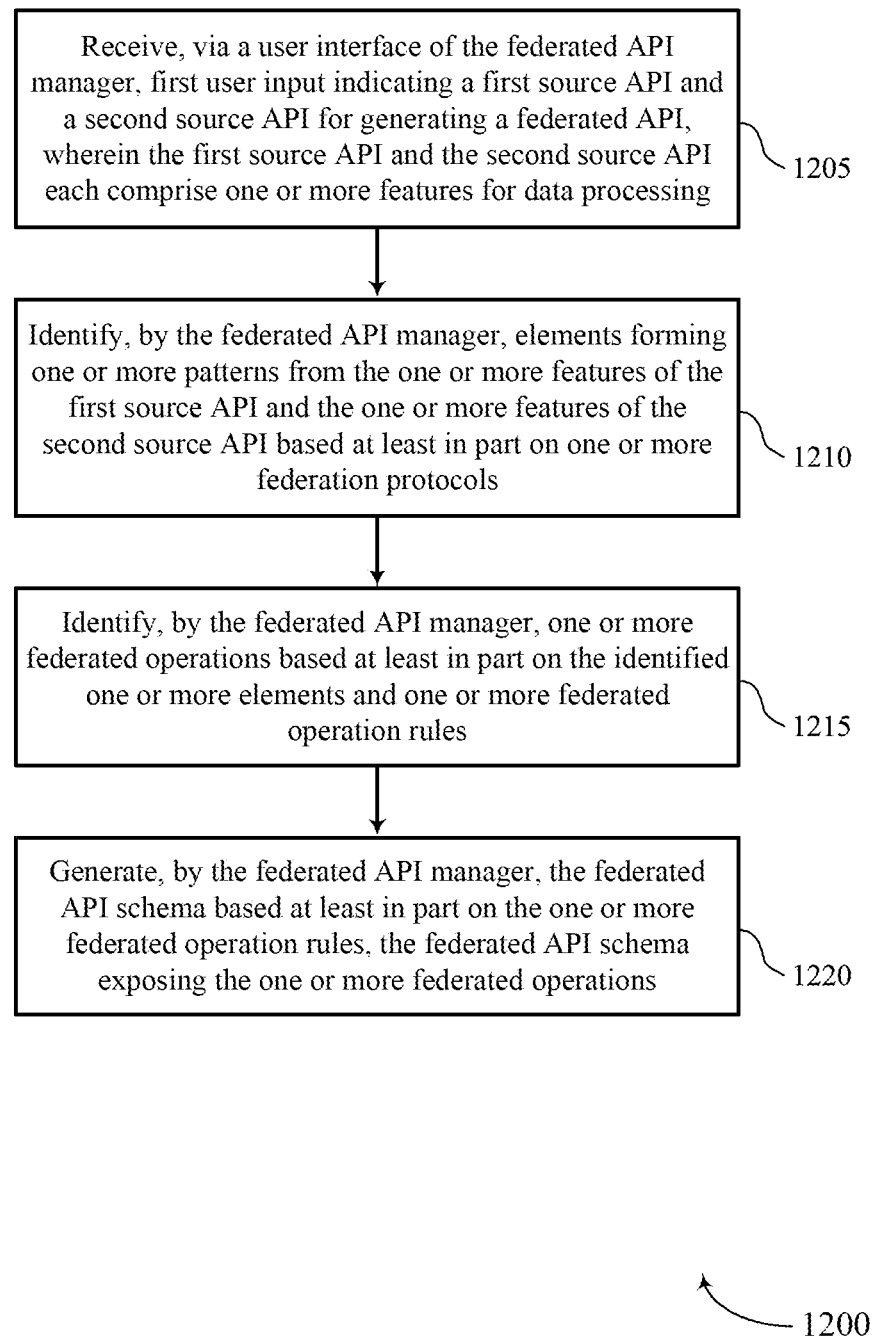
FIGS. 12 through 14 show flowcharts illustrating methods that support feature based application programming interface federation in accordance with aspects of the present disclosure.

FIG. 12 shows a flowchart illustrating a method 1200 that supports feature based application programming interface federation in accordance with aspects of the present disclosure. The operations of the method 1200 may be implemented by an application server or its components as described herein. For example, the operations of the method 1200 may be performed by an application server as described with reference to FIG. 1 through 11. In some examples, an application server may execute a set of instructions to control the functional elements of the application server to perform the described functions. Additionally or alternatively, the application server may perform aspects of the described functions using special-purpose hardware.

At 1205, the method may include receiving, via a user interface of the federated API manager, first user input indicating a first source API and a second source API for generating a federated API, wherein the first source API and the second source API each comprise one or more features for data processing. The operations of 1205 may be performed in accordance with examples as disclosed herein. In some examples, aspects of the operations of 1205 may be performed by a user input component 1025 as described with reference to FIG. 10.

At 1210, the method may include identifying, by the federated API manager, elements forming one or more patterns from the one or more features of the first source API and the one or more features of the second source API based at least in part on one or more federation protocols. The operations of 1210 may be performed in accordance with examples as disclosed herein. In some examples, aspects of the operations of 1210 may be performed by a pattern recognition component 1030 as described with reference to FIG. 10.

At 1215, the method may include identifying, by the federated API manager, one or more federated operations based at least in part on the identified one or more elements and one or more federated operation rules. The operations of 1215 may be performed in accordance with examples as disclosed herein. In some examples, aspects of the operations of 1215 may be performed by a federated operation component 1035 as described with reference to FIG. 10.

At 1220, the method may include generating, by the federated API manager, the federated API schema based at least in part on the one or more federated operation rules, the federated API schema exposing the one or more federated operations. The operations of 1220 may be performed in accordance with examples as disclosed herein. In some examples, aspects of the operations of 1220 may be performed by a federated schema generation component 1040 as described with reference to FIG. 10.

Figure 13:
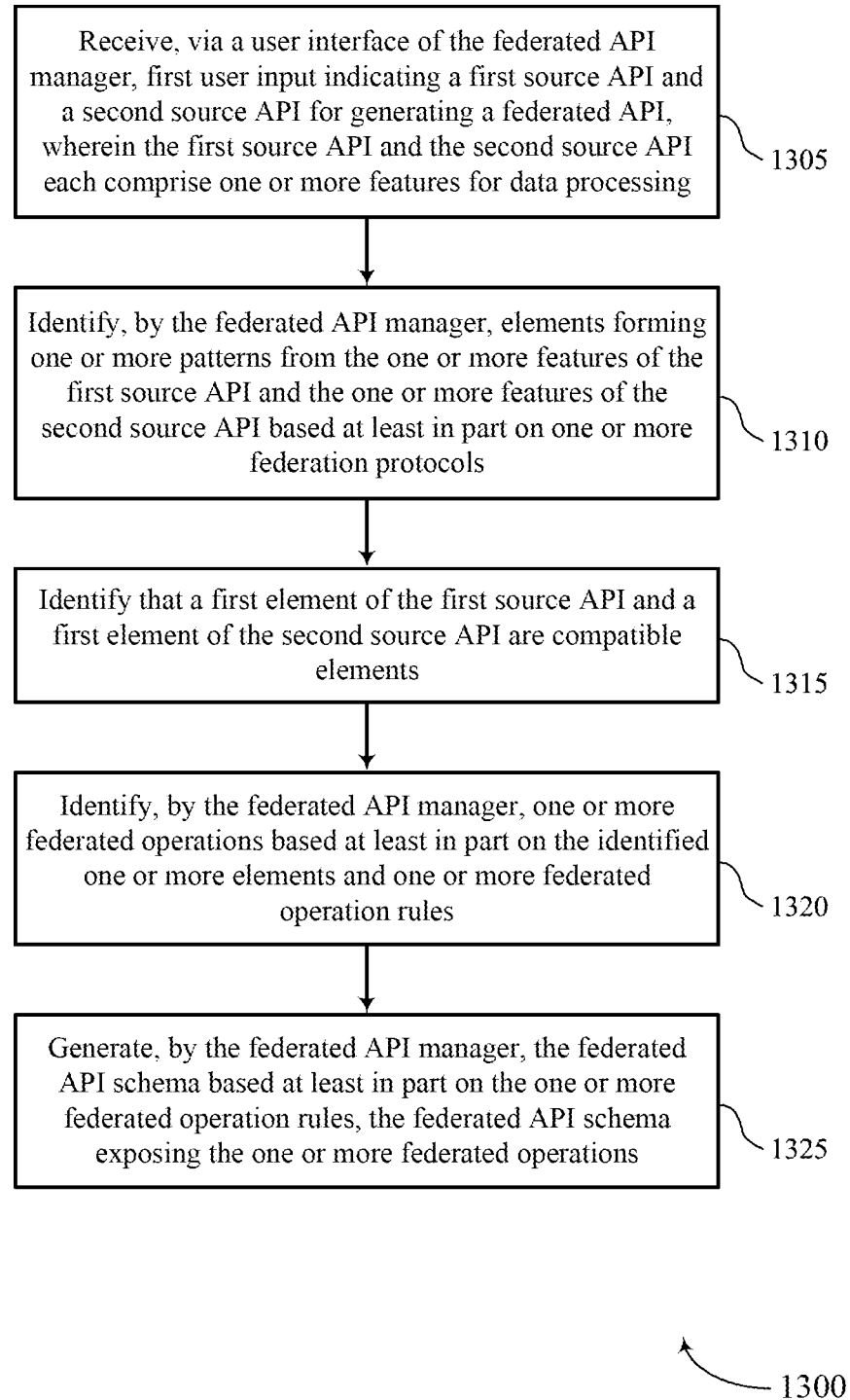

FIG. 13 shows a flowchart illustrating a method 1300 that supports feature based application programming interface federation in accordance with aspects of the present disclosure. The operations of the method 1300 may be implemented by an application server or its components as described herein. For example, the operations of the method 1300 may be performed by an application server as described with reference to FIGS. 1 through 11. In some examples, an application server may execute a set of instructions to control the functional elements of the application server to perform the described functions. Additionally or alternatively, the application server may perform aspects of the described functions using special-purpose hardware.

At 1305, the method may include receiving, via a user interface of the federated API manager, first user input indicating a first source API and a second source API for generating a federated API, wherein the first source API and the second source API each comprise one or more features for data processing. The operations of 1305 may be performed in accordance with examples as disclosed herein. In some examples, aspects of the operations of 1305 may be performed by a user input component 1025 as described with reference to FIG. 10.

At 1310, the method may include identifying, by the federated API manager, elements forming one or more patterns from the one or more features of the first source API and the one or more features of the second source API based at least in part on one or more federation protocols. The operations of 1310 may be performed in accordance with examples as disclosed herein. In some examples, aspects of the operations of 1310 may be performed by a pattern recognition component 1030 as described with reference to FIG. 10.

At 1315, the method may include identifying that a first element of the first source API and a first element of the second source API are compatible elements. The operations of 1315 may be performed in accordance with examples as disclosed herein. In some examples, aspects of the operations of 1315 may be performed by a pattern recognition component 1030 as described with reference to FIG. 10.

At 1320, the method may include identifying, by the federated API manager, one or more federated operations based at least in part on the identified one or more elements and one or more federated operation rules. The operations of 1320 may be performed in accordance with examples as disclosed herein. In some examples, aspects of the operations of 1320 may be performed by a federated operation component 1035 as described with reference to FIG. 10.

At 1325, the method may include generating, by the federated API manager, the federated API schema based at least in part on the one or more federated operation rules, the federated API schema exposing the one or more federated operations. The operations of 1325 may be performed in accordance with examples as disclosed herein. In some examples, aspects of the operations of 1325 may be performed by a federated schema generation component 1040 as described with reference to FIG. 10.

Figure 14:
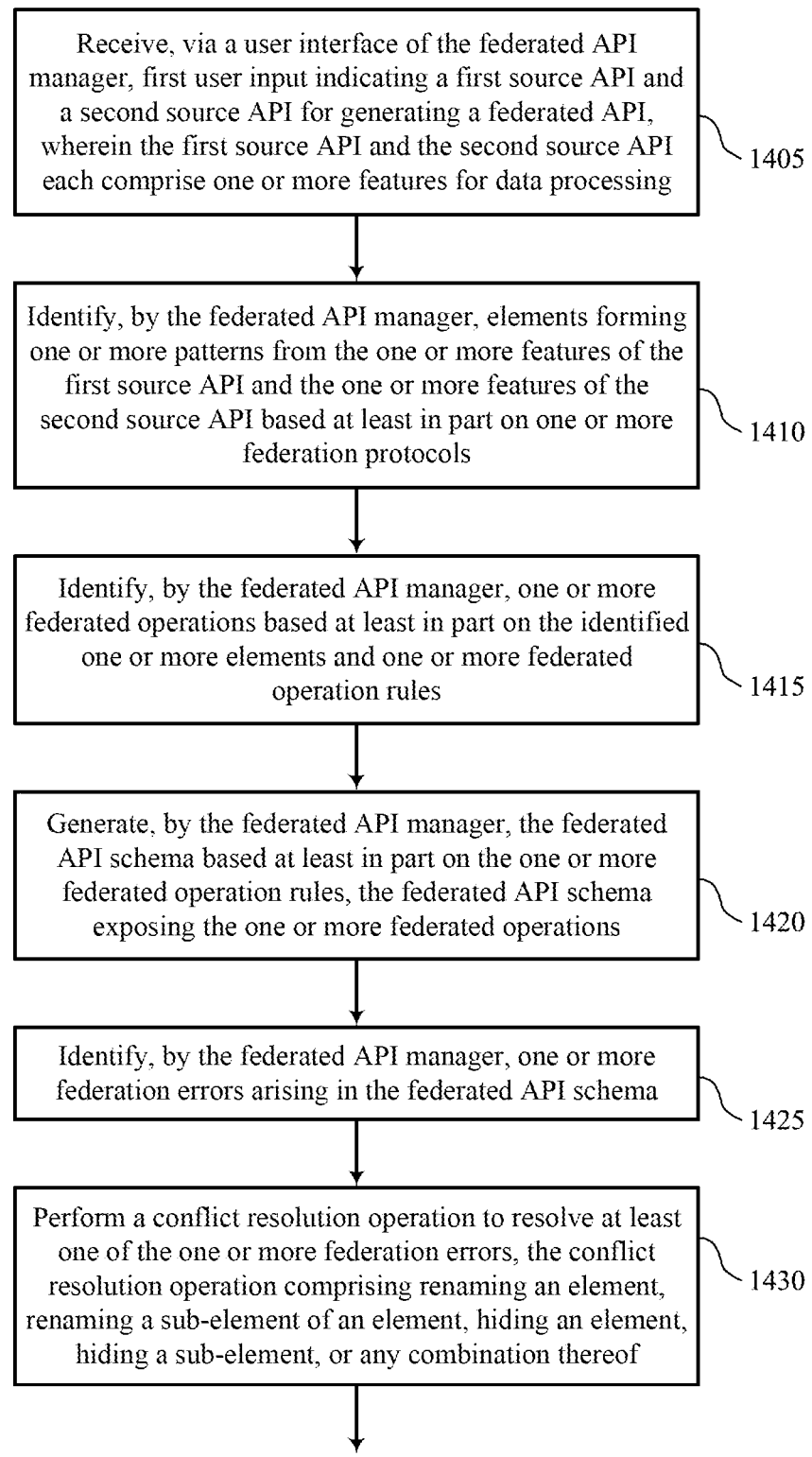

FIG. 14 shows a flowchart illustrating a method 1400 that supports feature based application programming interface federation in accordance with aspects of the present disclosure. The operations of the method 1400 may be implemented by an application server or its components as described herein. For example, the operations of the method 1400 may be performed by an application server as described with reference to FIGS. 1 through 11. In some examples, an application server may execute a set of instructions to control the functional elements of the application server to perform the described functions. Additionally or alternatively, the application server may perform aspects of the described functions using special-purpose hardware.

At 1405, the method may include receiving, via a user interface of the federated API manager, first user input indicating a first source API and a second source API for generating a federated API, wherein the first source API and the second source API each comprise one or more features for data processing. The operations of 1405 may be performed in accordance with examples as disclosed herein. In some examples, aspects of the operations of 1405 may be performed by a user input component 1025 as described with reference to FIG. 10.

At 1410, the method may include identifying, by the federated API manager, elements forming one or more patterns from the one or more features of the first source API and the one or more features of the second source API based at least in part on one or more federation protocols. The operations of 1410 may be performed in accordance with examples as disclosed herein. In some examples, aspects of the operations of 1410 may be performed by a pattern recognition component 1030 as described with reference to FIG. 10.

At 1415, the method may include identifying, by the federated API manager, one or more federated operations based at least in part on the identified one or more elements and one or more federated operation rules. The operations of 1415 may be performed in accordance with examples as disclosed herein. In some examples, aspects of the operations of 1415 may be performed by a federated operation component 1035 as described with reference to FIG. 10.

At 1420, the method may include generating, by the federated API manager, the federated API schema based at least in part on the one or more federated operation rules, the federated API schema exposing the one or more federated operations. The operations of 1420 may be performed in accordance with examples as disclosed herein. In some examples, aspects of the operations of 1420 may be performed by a federated schema generation component 1040 as described with reference to FIG. 10.

At 1425, the method may include identifying, by the federated API manager, one or more federation errors arising in the federated API schema. The operations of 1425 may be performed in accordance with examples as disclosed herein. In some examples, aspects of the operations of 1425 may be performed by a conflict resolution component 1045 as described with reference to FIG. 10.

At 1430, the method may include performing a conflict resolution operation to resolve at least one of the one or more federation errors. In some examples, the conflict resolution operation may comprise renaming an element, renaming a sub-element of an element, hiding an element, hiding a sub-element, or any combination thereof. The operations of 1430 may be performed in accordance with examples as disclosed herein. In some examples, aspects of the operations of 1430 may be performed by a conflict resolution component 1045 as described with reference to FIG. 10.

A method for generating a federated API schema by a federated API manager is described. The method may include receiving, via a user interface of the federated API manager, first user input indicating a first source API and a second source API for generating a federated API, wherein the first source API and the second source API each comprise one or more features for data processing, identifying, by the federated API manager, elements forming one or more patterns from the one or more features of the first source API and the one or more features of the second source API based at least in part on one or more federation protocols, identifying, by the federated API manager, one or more federated operations based at least in part on the identified one or more elements and one or more federated operation rules, and generating, by the federated API manager, the federated API schema based at least in part on the one or more federated operation rules, the federated API schema exposing the one or more federated operations.

An apparatus for generating a federated API schema by a federated API manager is described. The apparatus may include a processor, memory coupled with the processor, and instructions stored in the memory. The instructions may be executable by the processor to cause the apparatus to receive, via a user interface of the federated API manager, first user input indicating a first source API and a second source API for generating a federated API, wherein the first source API and the second source API each comprise one or more features for data processing, identify, by the federated API manager, elements forming one or more patterns from the one or more features of the first source API and the one or more features of the second source API based at least in part on one or more federation protocols, identify, by the federated API manager, one or more federated operations based at least in part on the identified one or more elements and one or more federated operation rules, and generating, by the federated API manager, the federated API schema based at least in part one the one or more federated operation rules, the federated API schema exposing the one or more federated operations.

Another apparatus for generating a federated API schema by a federated API manager is described. The apparatus may include means for receiving, via a user interface of the federated API manager, first user input indicating a first source API and a second source API for generating a federated API, wherein the first source API and the second source API each comprise one or more features for data processing, means for identifying, by the federated API manager, elements forming one or more patterns from the one or more features of the first source API and the one or more features of the second source API based at least in part on one or more federation protocols, means for identifying, by the federated API manager, one or more federated operations based at least in part on the identified one or more elements and one or more federated operation rules, and means for generating, by the federated API manager, the federated API schema based at least in part on the one or more federated operation rules, the federated API schema exposing the one or more federated operations.

A non-transitory computer-readable medium storing code for generating a federated API schema by a federated API manager is described. The code may include instructions executable by a processor to receive, via a user interface of the federated API manager, first user input indicating a first source API and a second source API for generating a federated API, wherein the first source API and the second source API each comprise one or more features for data processing, identify, by the federated API manager, elements forming one or more patterns from the one or more features of the first source API and the one or more features of the second source API based at least in part on one or more federation protocols, identify, by the federated API manager, one or more federated operations based at least in part on the identified one or more elements and one or more federated operation rules, and generating, by the federated API manager, the federated API schema based at least in part one the one or more federated operation rules, the federated API schema exposing the one or more federated operations.

In some examples of the method, apparatuses, and non-transitory computer-readable medium described herein, identifying, by the federated API manager, elements forming one or more patterns may include operations, features, means, or instructions for identifying that a first element of the first source API and a first element of the second source API may be compatible elements.

In some examples of the method, apparatuses, and non-transitory computer-readable medium described herein, identifying that the first element of the first source API and the first element of the second source API may be compatible elements may include operations, features, means, or instructions for identifying that the first element of the first source API and the first element of the second source API each comprise a compatible element identifier.

In some examples of the method, apparatuses, and non-transitory computer-readable medium described herein, generating the federated API schema may include operations, features, means, or instructions for generating a federated element comprising the union of a set of sub-elements of the first element of the first source API and a set of sub-elements of the first element of the second source API.

In some examples of the method, apparatuses, and non-transitory computer-readable medium described herein, identifying that the first element of the first source API and the first element of the second source API may be compatible elements may include operations, features, means, or instructions for identifying that the first element of the first source API and the first element of the second source API each comprise a compatible data type.

In some examples of the method, apparatuses, and non-transitory computer-readable medium described herein, identifying that the first element of the first source API and the first element of the second source API may be compatible elements may include operations, features, means, or instructions for identifying that the first element of the first source API and the first element of the second source API each comprise a compatible dataset instance identifier.

In some examples of the method, apparatuses, and non-transitory computer-readable medium described herein, generating the federated API schema may include operations, features, means, or instructions for generating a federated element comprising the union of a set of sub-elements of the first element of the first source API and a set of sub-elements of the first element of the second source API.

In some examples of the method, apparatuses, and non-transitory computer-readable medium described herein, identifying that the first element of the first source API and the first element of the second source API may be compatible elements may include operations, features, means, or instructions for identifying that the first element of the first source API and the first element of the second source API each comprise a compatible lookup field associated with the compatible dataset instance identifier.

In some examples of the method, apparatuses, and non-transitory computer-readable medium described herein, identifying that the first element of the first source API and the first element of the second source API may be compatible elements may include operations, features, means, or instructions for identifying that the first element of the first source API comprises a reference that may be compatible with the first element of the second source API.

In some examples of the method, apparatuses, and non-transitory computer-readable medium described herein, generating the federated API schema may include operations, features, means, or instructions for replacing an operation for retrieval of the first element of the first source API with an operation for retrieval of the first element of the second source API.

Some examples of the method, apparatuses, and non-transitory computer-readable medium described herein may further include operations, features, means, or instructions for identifying, by the federated API manager, one or more federation errors arising in the federated API schema and performing a conflict resolution operation to resolve at least one of the one or more federation errors.

In some examples of the method, apparatuses, and non-transitory computer-readable medium described herein, the conflict resolution operation comprises renaming an element, renaming a sub-element of an element, hiding an element, hiding a sub-element, or any combination thereof.

Some examples of the method, apparatuses, and non-transitory computer-readable medium described herein may further include operations, features, means, or instructions for determining whether a schema of the first source API or the second source API violates the one or more federation operation rules.

Some examples of the method, apparatuses, and non-transitory computer-readable medium described herein may further include operations, features, means, or instructions for generating the federated API schema may be further based at least in part on the one or more federated operations.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random-access memory (RAM), read-only memory (ROM), electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating a federated application programming interface (API) schema by a federated API manager, comprising:
   receiving, via a user interface of the federated API manager, first user input indicating a first source API and a second source API for generating a federated API, wherein the first source API and the second source API each comprise one or more features for data processing;
   identifying, by the federated API manager, elements forming one or more schema patterns of features from a first API schema of the first source API and a second API schema of the second source API based at least in part on one or more federation protocols and identifying that a first element of the first source API and a second element of the second source API are combinable for use in a federated operation, wherein identifying that the first element of the first source API and the first element of the second source API are combinable for use in a federated operation comprises identifying that the first element of the first source API comprises a reference that is compatible with the first element of the second source API;
   identifying, by the federated API manager, one or more federated operations based at least in part on the identified one or more elements and one or more federated operation rules; and
   generating, by the federated API manager, the federated API schema based at least in part on the one or more federated operation rules, the federated API schema exposing the one or more federated operations, wherein generating the federated API schema comprises replacing an operation for retrieval of the first element of the first source API with an operation for retrieval of the first element of the second source API.

2. The method of claim 1, wherein identifying that the first element of the first source API and the first element of the second source API are combinable for use in a federated operation comprises:
   identifying that the first element of the first source API and the first element of identifying that the first element of the first source API and the first element of the second source API each comprise a compatible element identifier.

3. The method of claim 2, wherein generating the federated API schema comprises:
   generating a federated element comprising a logical union of a set of sub-elements of the first element of the first source API and a set of sub-elements of the first element of the second source API.

4. The method of claim 2, wherein identifying that the first element of the first source API and the first element of the second source API are combinable for use in a federated operation further comprises:
   identifying that the first element of the first source API and the first element of the second source API each comprise a compatible data type.

5. The method of claim 1, wherein identifying that the first element of the first source API and the first element of the second source API are combinable for use in a federated operation comprises:
   identifying that the first element of the first source API and the first element of the second source API each comprise a compatible dataset instance identifier.

6. The method of claim 5, wherein generating the federated API schema comprises:
   generating a federated element comprising a logical union of a set of sub-elements of the first element of the first source API and a set of sub-elements of the first element of the second source API.

7. The method of claim 5, wherein identifying that the first element of the first source API and the first element of the second source API are combinable for use in a federated operation further comprises:
   identifying that the first element of the first source API and the first element of the second source API each comprise a compatible lookup field associated with the compatible dataset instance identifier.

8. The method of claim 1, further comprising:
   identifying, by the federated API manager, one or more federation errors arising in the federated API schema; and
   performing a conflict resolution operation to resolve at least one of the one or more federation errors.

9. The method of claim 8, wherein the conflict resolution operation comprises renaming an element, renaming a sub-element of an element, hiding an element, hiding a sub-element, or any combination thereof.

10. The method of claim 1, further comprising:
    determining whether a schema of the first source API or the second source API violates the one or more federated operation rules.

11. The method of claim 1, wherein generating the federated API schema is further based at least in part on the one or more federated operations.

12. An apparatus for generating a federated application programming interface (API) schema by a federated API manager, comprising:
    a processor;
    memory coupled with the processor; and
    instructions stored in the memory and executable by the processor to cause the apparatus to:
      receive, via a user interface of the federated API manager, first user input indicating a first source API and a second source API for generating a federated API, wherein the first source API and the second source API each comprise one or more features for data processing;
      identify, by the federated API manager, elements forming one or more schema patterns of features from a first API schema of the first source API and a second API schema of the second source API based at least in part on one or more federation protocols and identifying that a first element of the first source API and a second element of the second source API are combinable for use in a federated operation, wherein identifying that the first element of the first source API and the first element of the second source API are combinable for use in a federated operation comprises identifying that the first element of the first source API comprises a reference that is compatible with the first element of the second source API;
      identify, by the federated API manager, one or more federated operations based at least in part on the identified one or more elements and one or more federated operation rules; and generate, by the federated API manager, the federated API schema based at least in part one the one or more federated operation rules, the federated API schema exposing the one or more federated operations, wherein generating the federated API schema comprises replacing an operation for retrieval of the first element of the first source API with an operation for retrieval of the first element of the second source API.

13. The apparatus of claim 12, wherein the instructions to identify that the first element of the first source API and the first element of the second source API are combinable for use in a federated operation are executable by the processor to cause the apparatus to:

identify that the first element of the first source API and the first element of the second source API each comprise a compatible element identifier.

14. The apparatus of claim 12, wherein the instructions to identify that the first element of the first source API and the first element of the second source API are combinable for use in a federated operation are executable by the processor to cause the apparatus to:

identify that the first element of the first source API and the first element of the identify that the first element of the first source API and the first element of the second source API each comprise a compatible dataset instance identifier.

15. A non-transitory computer-readable medium storing code for generating a federated application programming interface (API) schema by a federated API manager, the code comprising instructions executable by a processor to:

receive, via a user interface of the federated API manager, first user input indicating a first source API and a second source API for generating a federated API, wherein the first source API and the second source API each comprise one or more features for data processing;

identify, by the federated API manager, elements forming one or more schema patterns of features from a first API schema of the first source API and a second API schema of the second source API based at least in part on one or more federation protocols and identifying that a first element of the first source API and a second element of the second source API are combinable for use in a federated operation, wherein identifying that the first element of the first source API and the first element of the second source API are combinable for use in a federated operation comprises identifying that the first element of the first source API comprises a reference that is compatible with the first element of the second source API;

identify, by the federated API manager, one or more federated operations based at least in part on the identified one or more elements and one or more federated operation rules; and generate, by the federated API manager, the federated API schema based at least in part one the one or more federated operation rules, the federated API schema exposing the one or more federated operations, wherein generating the federated API schema comprises replacing an operation for retrieval of the first element of the first source API with an operation for retrieval of the first element of the second source API.

\* \* \* \* \*